(12) United States Patent
Willis et al.

(10) Patent No.: US 7,873,663 B2
(45) Date of Patent: Jan. 18, 2011

(54) METHODS AND APPARATUS FOR CONVERTING A REPRESENTATION OF XML AND OTHER MARKUP LANGUAGE DATA TO A DATA STRUCTURE FORMAT

(75) Inventors: Steven R. Willis, Acton, MA (US); Heather D. Achilles, Hudson, NH (US); Patrick R. McManus, Boston, MA (US); Nicholas D. Matsakis, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 10/883,483

(22) Filed: Jul. 1, 2004

(65) Prior Publication Data

US 2006/0253465 A1    Nov. 9, 2006

Related U.S. Application Data

(60) Provisional application No. 60/536,039, filed on Jan. 13, 2004, provisional application No. 60/539,357, filed on Jan. 27, 2004, provisional application No. 60/548,034, filed on Feb. 26, 2004, provisional application No. 60/561,030, filed on Apr. 9, 2004.

(51) Int. Cl.
*G06F 7/00* (2006.01)
*G06F 17/30* (2006.01)

(52) U.S. Cl. ............... 707/791; 707/758; 715/234

(58) Field of Classification Search ............ 715/513; 707/1–10, 101
See application file for complete search history.

(56) References Cited

U.S. PATENT DOCUMENTS

| | | | |
|---|---|---|---|
| 6,804,677 B2* | 10/2004 | Shadmon et al. | 707/101 |
| 6,925,631 B2* | 8/2005 | Golden | 717/115 |
| 7,080,094 B2* | 7/2006 | Dapp et al. | 707/102 |
| 7,133,857 B1* | 11/2006 | Zhang et al. | 707/1 |
| 2003/0046317 A1* | 3/2003 | Cseri et al. | 707/513 |
| 2004/0006741 A1* | 1/2004 | Radja et al. | 715/513 |
| 2004/0028049 A1* | 2/2004 | Wan | 370/394 |
| 2004/0054535 A1* | 3/2004 | Mackie et al. | 704/260 |
| 2004/0199586 A1* | 10/2004 | Kaler et al. | 709/206 |

OTHER PUBLICATIONS

Markus L. Noga, Steffen Schott, and Welf Löwe. "Lazy XML processing", Nov. 8, 2002, In Proceedings of the 2002 ACM Symposium on Document Engineering. ACM Press.*

(Continued)

*Primary Examiner*—Shew-Fen Lin
(74) *Attorney, Agent, or Firm*—Chapin IP Law, LLC; Barry W. Chapin, Esq.

(57) ABSTRACT

Systems, methods and apparatus operate to convert a markup language representation such as XML to a data structure format such as a tree containing representations of constructs in the markup language representation. The operations receive a markup language representation containing encoded items representative of markup language constructs and identifying a sequence of encoded items within the intermediate representation that represents a respective markup language construct. In response, the system establishes, within a buffer of nodes, a new node for the sequence of encoded items that represents a respective markup language construct and creates, from the buffer of nodes, a linked data structure that represents relationships between the markup language constructs represented within the markup language representation.

46 Claims, 9 Drawing Sheets

OTHER PUBLICATIONS

Java 2 Plateform Ent. Ed. V1.4, 2003, see http://java.sun.com/j2ee/1.4/docs/api/javax/xml/namespace/QName.html (6 pages).*

XMLUtils, Apache Web Services Project, 2003, http://192.87.31.188/wst/org/apache/axis/utils/XMLUtils.html (15 pages).*

* cited by examiner

FIG. 6 — NODE ALLOCATION

FIG. 7 — QNAME CREATION

QNAME ASSIGNMENT TO NODE

STACK PROCESSING

POINTER PROCESSING AND TREE CREATION

METHODS AND APPARATUS FOR CONVERTING A REPRESENTATION OF XML AND OTHER MARKUP LANGUAGE DATA TO A DATA STRUCTURE FORMAT

CLAIM TO BENEFIT OF FILING DATE OF EARLIER FILED APPLICATIONS

This patent application claims the benefit of the filing date of the following co-pending Provisional applications:

1) Provisional Patent Application entitled "METHOD AND APPARATUS FOR PROCESSING MARKUP LANGUAGE INFORMATION" filed Jan. 13, 2004, having Ser. No. 60/536,039.

2) Provisional Patent Application entitled "METHOD AND APPARATUS FOR MARKUP LANGUAGE PROCESSING AND TREE BUILDING" filed Jan. 27, 2004, having Ser. No. 60/539,357.

3) Provisional Patent Application entitled "METHODS AND APPARATUS FOR STREAM PROCESSING OF MARKUP LANGUAGE DATA" filed Feb. 26, 2004, having Ser. No. 60/548,034.

4) Provisional Patent Application entitled "METHOD AND APPARATUS FOR XML STREAM BASED XPATH EXPRESSION EVALUATION" filed Apr. 9, 2004 having Ser. No. 60/561,030. Each of the above referenced applications is assigned to the same Assignee as the present application. The entire teachings, figures and contents of the above-identified applications are hereby incorporated by reference herein.

RELATION TO CO-PENDING APPLICATIONS

This patent application relates to technology disclosed in the following co-pending Provisional and Utility patent applications:

5) U.S. Utility patent application entitled "METHODS AND APPARATUS FOR PROCESSING MARKUP LANGUAGE MESSAGES IN A NETWORK", Filed Dec. 22, 2003, having Ser. No. 10/745,326.

6) U.S. Utility patent application entitled "METHODS AND APPARATUS FOR PROCESSING MARKUP LANGUAGE INFORMATION", Filed Jul. 1, 2004, having Ser. No. 10/883,018.

7) U.S. Utility patent application entitled "METHODS AND APPARATUS FOR CONVERTING MARKUP LANGUAGE DATA TO AN INTERMEDIATE REPRESENTATION", Filed Jul. 1, 2004, having Ser. No. 10/883,484.

8) U.S. Utility patent application entitled "METHOD AND APPARATUS FOR STREAM BASED MARKUP LANGUAGE POST-PROCESSING", Filed Jul. 1, 2004, having Ser. No. 10/883,016.

Each of the above referenced applications is assigned to the same Assignee as the present application. The entire teachings, figures and contents of the above-identified applications are hereby incorporated by reference herein.

BACKGROUND

Conventional computer networking environments support the exchange of information and data between many interconnected computer systems using a variety of mechanisms. In an example computer-networking environment such as the Internet, one or more client computer systems can operate client software applications that transmit data access requests using one or more data communications protocols over the computer network to server computer systems for receipt by server software application(s) executing on those servers. The server software application(s) receive and process the client data access requests and can prepare and transmit one or more server responses back to the client computer systems for receipt by the client software applications. In this manner, client/server software applications can effectively exchange data over a network using agreed-upon data formats.

One example of a conventional information exchange system that operates between computer systems over a computer network such as the Internet is provided by a set of applications and protocols collectively referred to as the World Wide Web. In a typical conventional implementation of the World Wide Web, client computer systems operate a client software application referred to as a web browser. A typical web browser operates to provide hypertext transport protocol (HTTP) requests for documents, referred to as "web pages," over the computer network to web server computer systems. A web server software application operating in the web server computer system can receive and process an HTTP web page request and can return or "serve" a corresponding web page document or file specified (i.e., requested) in the client request back to the requesting client computer system over the computer network for receipt by the client's web browser. The web page is typically formatted in a markup language such as the hypertext markup language (HTML). Data exchanged between clients and servers may also be formatted in other markup languages, such as the extensible markup language (XML) or in a combination of markup languages that allows the one computer system to receive and interpret the data encoded with the markup language information within the document in order to process a response.

In addition to simply accessing web pages, more recent conventional software and networking technologies that work in conjunction with protocols such as HTTP provide complete networked or web-based "applications" or services, sometimes referred to as "web services", over a computer network such as the Internet. Conventional web services architectures allow server-to-server connectivity, exchange and processing of data for business or other applications. Presently, there is a convergence to the use of XML to encode data that is exchanged between network-based server applications such as the world-wide-web, web services, or other network-based applications since XML is extensible and flexible and can be used to encode data of any type.

Conventional XML processing technologies that operate within computer systems generally rely on software processing to allow the computer systems (e.g., web servers) to interpret and process the XML-encoded data in a variety of ways. Several conventional XML technologies allow a software application to access (e.g., extract) XML-encoded data for application processing purposes. As an example, a web server can use conventional XML software processing technologies such as the Document Object Model (DOM) to convert XML files or documents into a DOM "tree". The DOM system also includes a set of standardized DOM functions that can be used to navigate the XML data within the DOM tree to access certain portions of the XML encoded data.

Other conventional XML processing technologies include the Simple Application programming interface for XML (SAX) to parse XML encoded data (referred to sometimes as XML documents) to gain access to the content encoded therein. In addition, other XML-related technologies such as the eXtensible Stylesheet Transformation Language (XSLT) allow a developer of an XML-aware software application to define transformations of XML encoded data from one data format to another. Extensible Stylesheet Transformations (XSLT) is a language for converting, or transforming, documents written in XML into other formats, including HTML and other XML vocabularies. An XSL document is used to transform an XML document, or a portion of data contained in such a document, from one format to another (e.g., XML to HTML). A schema is a description in a meta-language specifying the acceptable syntax of an XML vocabulary. A schema document is used to validate an XML document and guarantee its syntax is correct. A filter is an XSLT document used to produce a decision on the acceptability of an input XML document based on an arbitrary set of criteria. A filter verifies an input document based on semantic or other content (transformed or not transformed) not typically related to syntax, and so differs from a schema validation in this way.

SUMMARY

Conventional mechanisms and techniques for processing data encoded in a markup language such as, for example, XML, suffer from a variety of deficiencies. In particular, such conventional markup language processing techniques are software-based and are quite verbose and burdensome on the processing resources of server computer systems, resulting in the introduction of bottlenecks in the flow of information between enterprise applications. Conventional software applications that use XML encoded data are required to include software routines to receive, parse, transform and otherwise process the raw, character-based XML data using the wide array of conventional software tools available for such purposes, thus resulting in significant overhead to such software applications.

As an example, there are numerous XML processing operations that a server may be required to apply on a received XML document prior to being able to perform the intended application level processing provided by that server on the application data encoded within the XML document. By way of example, depending upon the robustness of the server application, when XML data is received at a server, XML processing software executing on the central processing unit of the server may be required convert the XML into a DOM tree for processing portions of the XML document. DOM document processing cannot begin until the DOM processing has completely received the XML document and converted into the DOM tree format. This can be problematic because XML documents may be quite large and it may take significant amounts of time to simply receive and input the native XML into the DOM tree prior to allowing a software application to access the application data or content using the DOM functions. Conventional software applications that are in need of the content or application data embedded in the XML document must therefore wait for the DOM tree to be fully populated before accessing such data. Since XML encoded data is inherently text-based, XML documents can become very large in size. Conventional XML DOM processing is software based and places a significant burden on memory and processing resources (that also must execute the end-user or application that requires access the content within the received XML document). In a server or other computer system, when dealing with large markup language documents that are many megabytes in size, or when dealing with heavy volumes of smaller documents, such processing can impact overall performance. However, all of this conventional processing is often required when dealing with XML and other markup language encoded data in order to provide robust and fault tolerant data processing and to provide access to the encoded application data contained within the XML document.

Furthermore, conventional markup language processing techniques are typically implemented in software within a server computer system, as opposed to hardware. As an example, software implementations of XML processing tend to be tightly integrated with operation of the server application, such as an XML-based web services application. As XML standards evolve and change over time, re-engineering of the XML portions of the server software application to take advantage of, or adapt to, changing XML standards can be quite costly. An organization must both purchase and reinstall a new version of the XML processing software to adapt the software to changing XML standards, or if the software is developed in-house, the organization must undertake the task of re-tooling (designing, coding, testing and debugging) the server application code itself to account for changing XML standards. Either situation can be very costly to an organization operating XML-based applications.

Generally then, conventional implementations of markup language data processing incur significant overhead due to the need of a computer to parse and manipulate XML-encoded data, a data encoding which is text-based, verbose and inefficient, to perform many basic processing operations. The performance overhead of such operations performed within a conventional server-based implementation can negate the business advantages of their deployment. Moreover, it is not easy or straightforward to perform a sequence of actions on an XML document consisting of one or more transformations, schema validations, and filters in a server-based architecture due to the significant software complexities of such operations. Conventional XML processing tools such as the DOM provide software-based conversion of the XML data into a data structure such as a DOM tree, but such conventional XML conversion tools do not provide an intermediate representation other than the DOM tree that is easy to manipulate for varying purposes. Hardware acceleration of XML parsing can help these performance challenges, but presents a number of challenges. First, the processing of markup languages is much more complex than the types of operations that are usually implemented in hardware, and a number of non-obvious innovations are required to make it possible. Second, the nature of web services is that some processing must necessarily occur on a general purpose CPU where the user application resides, and so the processed XML must be presented to the software program in the form most optimal and useful to it, which is often DOM or a DOM-like tree structure optimized for easy traversing, random access and manipulation. This kind of data structure requires pointer links and must be created in memory directly accessible to the processor executing the user software. A hardware accelerator is generally connected to the processor system via a bus or network interface, and is not able to create an in-memory tree directly accessible to the software. This second limitation presents a further barrier to the successful application of hardware to processing of XML-encoded data.

Embodiments of the invention significantly overcome these and other deficiencies associated with conventional markup language processing implementations. To do so, embodiments of the invention include systems, methods and apparatus that provide a markup language processing device that implements a method for converting a markup language data, such as XML data formatted according to an extensible markup language (XML) specification that is represented, for example, in an intermediate representation containing encoded items representative of an original stream of markup language data (e.g., XML), into a data structure format such as a tree. Embodiments of the invention can be hardware-based and can produce a tree based on the markup language representation within a memory accessible to a software application or other hardware processing requiring access to the tree. Conversion of the markup language data representation into a tree allow access to constructs within the original markup language by subsequent processing such as a software application operating in conjunction with the markup language processing device. The invention is generally referred to herein as an output generator that contains a tree builder that produces a linked tree data structure. It is to be understood however that embodiments of the invention may include an entire computer system equipped with a markup language processing device containing the tree building output generator, a markup language processing device alone, such as a co-processor or add-on board or card for processing markup language into trees, or a software system that implements the processing operations explained herein, or a combination of hardware and software to perform such operations.

The intermediate representation used as input to embodiments of the invention in one example contains encoded items representative of the original stream of markup language data. In one embodiment, the encoded items contain type, length, value (TLV) or type, length, attribute (TLA) representations of XML constructs. For purposes of description of embodiments of the invention, the term "encoded item" as used herein includes type, length, value (TLV) and/or type, length, attribute (TLA) encoded items representations. In addition, for ease of description, both TLV and TLA representations are considered substantially equivalent and thus type, length, value (TLV) will be used throughout this description. It is to be thus understood than that type, length, value (TLV) encoded item representations include both TLV and TLA representations. Generally, a TLV encoded item contains at least two fields; a Type field (the "T" in TLV) that indicates a type of markup language construct being represented, and a Length field (the "L" in TLV) that contains a length of data contained in a Value or Attribute fields (the "V" in TLV for Value, or the "A" in TLA for Attribute). As a very brief example, if an XML comment field appears in an XML data stream as follows:

<!—This is a comment—>

A character processor providing input to the present invention can convert the XML comment above into the following TLV encoded item (i.e., a representation of a markup language comment construct) shown in the second row of the table below:

| T | L | V |
|---|---|---|
| Comment | 17 | This is a comment |

A sequence of one or more encoded items can represent all of the different types of XML constructs. As a result, the character processor converts XML data or documents into a corresponding TLV or TLA representation for input to the tree builder of this invention. The tree builder operates to convert this markup language representation (e.g., a sequence of TLVs) to a data structure format such as a tree containing representations of constructs in the markup language representation. This is accomplished by receiving a markup language representation containing encoded items representative of markup language constructs and identifying a sequence of encoded items within the intermediate representation that represents a respective markup language construct. The output generator establishes, within a buffer of nodes in memory, a new node for the sequence of encoded items that represents the respective markup language construct. The output generator is able to operate in conjunction with an application (e.g., a software program or application) to create, from the buffer of nodes, a linked data structure that represents relationships between the markup language constructs represented within the markup language representation. In one configuration, the system of the invention creates a tree data structure from the buffer of nodes. The tree data structure contains linked nodes that represent a hierarchical relationship existing between the markup language constructs represented within the markup language representation.

Depending upon the encoded items being processed, the output generator matches the type of the encoded items to identify corresponding markup language construct that and in response creates a node in the tree such as a new attribute node, a new element node, a new processing instruction node or a new content node within the buffer of nodes. In addition, the output generator sets data fields within the new node with corresponding data associated with the encoded item. The data fields include a node type data field and a set of related node data fields such as pointers that associate the new node to at least one other node previously allocated in the buffer. The tree in one configuration is unique in that a first child node of a parent node can include sibling pointers to point to successive children of the parent node. Sibling nodes can reference forward and reverse sibling pointers to allow navigation between parent's children.

Other features of embodiments of the invention that will be described in more detail herein include maintaining a stack to track hierarchical levels of markup language constructs during processing of sequences of encoded items of the markup language representation. Thus, the hierarchical levels of nested elements can be conveyed in the tree via parent child node pointer relationships tracked using the stack. In particular, the output generator can set at least one pointer associated with the new node to reference at least one other node based on data within the stack such that the pointer associated with the new node in relation to the other node represents the hierarchical levels of markup language constructs as expressed in the encoded items of the markup language representation.

Embodiments of the invention can be implemented in hardware, for example, as a programmed FPGA. In embodiments of the invention, buffer management is used to allow the output generator to create nodes in a buffer, and when the buffer becomes full, the output generator can pass the full buffer to an external tree maintaining mechanism, such as software program or application that can receive the buffer of nodes along with an indication of which node in the tree to attach the buffer as a "branch" of the tree. In particular, the output generator determines if a buffer of nodes is available for allocation of the new node, and if not, creates a new buffer of nodes as the buffer of nodes in which new nodes can be allocated. As the buffer is used, the output generator determines if sufficient space is available within the buffer of nodes for creation of a new node, and if sufficient space is available within the buffer of nodes for creation of a new node, the output generator allocates an appropriate type of node as the new node within the buffer of nodes based on the matched type of the at least one encoded item. If sufficient space is not available within the buffer of nodes for creation of a new node, the output generator provides the buffer of nodes as a branch of the tree data structure to a tree maintaining mechanism and creates a new buffer of nodes as the buffer of nodes in which new nodes can be allocated.

Depending upon the type of TLV encountered, different types of nodes can be created. In particular, the output generator can create element nodes, attribute nodes, text/comment nodes, and processing instruction (PI) statement nodes. In some instances, the output generator identifies that the type of the encoded item requires allocation of a node including a numeric representation of the value field of the encoded item. This numeric representation in one embodiment is referred to as a QNAME. Among other benefits, the subsequent processing of XML-encoded data is greatly eased by enabling such frequent operations as element name comparisons to be performed by simply comparing one or more integer codes (i.e., QNAMES) rather than inefficient string comparisons, and storage requirements are reduced by effectively compressing the data without losing information. To produce a QNAME, the output generator obtains QCODE values for a prefix portion, namespace portion, and suffix portion associated with the data in the value field the encoded item and combines the QCODE values for a prefix portion, namespace portion, and suffix portion to produce the QNAME for data within the value field of the encoded item.

In one embodiment, obtaining QCODE values for a prefix portion, namespace portion, and suffix portion associated with the data in the value field of the encoded item includes generating a hash of the data within the value field of the at least one encoded item and determining if a QCODE has been previously generated based on the hash for the data within the value field of the encoded item. If a QCODE has been previously generated, the output generator obtains the previously generated QCODE for the data within the value field of the encoded item, and if a QCODE has not been previously generated, the output generator causes generation of a QCODE on the data within the value field of the encoded item. The system maintains the generated QCODE in a list of QCODEs. A namespace QCODE is also obtained, or a default value is used for the namespace portion associated with the value field of the encoded item. The output generator further obtains a QCODE for prefix and/or suffix data within the value field of the encoded item. In this manner, the output generator (or a QNAME processor) generates the numeric representation (i.e., the QNAME) of the value field of the encoded item. The output generator then copies data associated with the value field of the encoded item to a text buffer and assigns the numeric representation of the value field to the new node as a QNAME. The output generator provides the node with a pointer from the new node to the text buffer containing the data associated with the value field of the encoded item. The use of QNAMES in a node allows efficient searching of the linked tree data structure.

Other embodiments of the invention include a markup language processing device such as any type of computerized device such as a computer system, peripheral device (e.g., a circuit card or co-processor that can be installed into a computerized device for processing XML data, such as an XML co-processor), a network or data communications device, switch, router or the like configured with software and/or circuitry that implements an output generator operable as a tree builder as summarized above and as explained in further detail below, to process any or all of the method operations disclosed herein as embodiments of the invention. Still other embodiments of the invention include software or firmware programs that can operate alone or in conjunction with each other in a computerized device to perform the method embodiment steps and operations summarized above and disclosed in detail below. Preferred embodiments are implemented in hardware for speed of processing, though software implementations are considered to be embodiments of the invention as well.

One such software embodiment comprises a computer program product that has a computer-readable medium including computer program logic encoded thereon that, when performed in a computerized device having a coupling of a memory and a processor, programs the processor to perform the output generator operations disclosed herein as embodiments of the invention to carry out processing on markup language data, such as XML or upon other markup languages. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device to cause the computerized device to perform the techniques explained herein as embodiments of the invention. Thus, software code written upon any computer readable medium that contains instructions to carry out novel combinations of processing steps as explained herein, or any equivalents thereto, is considered an embodiment of the invention.

It is to be understood that the system of the invention can be embodied strictly as a software program, as software and hardware, or as hardware alone (e.g., such as an XML co-processor on a chip, or in a circuit card, or as part of a network device). Example embodiments of the invention may be implemented within computer systems, network devices, processors, circuits, ASICs, FPGAs, and/or computer program products and/or software applications manufactured by Datapower Technology, Inc. of Cambridge, Mass., USA. Co-pending U.S. Patent Application referenced above as Ser. No. 10/883,018 discloses a markup language processing device within which embodiments of the present disclosed invention operate.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention provide a markup language processing device that implements a method for converting a markup language data, such as XML data formatted according to an extensible markup language (XML) specification that is represented in an intermediate representation containing encoded items representative of an original stream of markup language data (e.g., XML), into a data structure format such as a tree. Conversion of the markup language data representation into a tree allow access to constructs within the original markup language by subsequent processing such as a software application operating in conjunction with the markup language processing device. The invention is generally referred to herein as an output generator that contains a tree builder that produces a linked tree data structure. It is to be understood however that embodiments of the invention may include an entire computer system equipped with a markup language processing device containing the tree building output generator, a markup language processing device alone, such as a co-processor or add-on board or card for processing markup language into trees, or a software system that implements the processing operations explained herein, or a combination of hardware and software to perform such operations.

Figure 1:
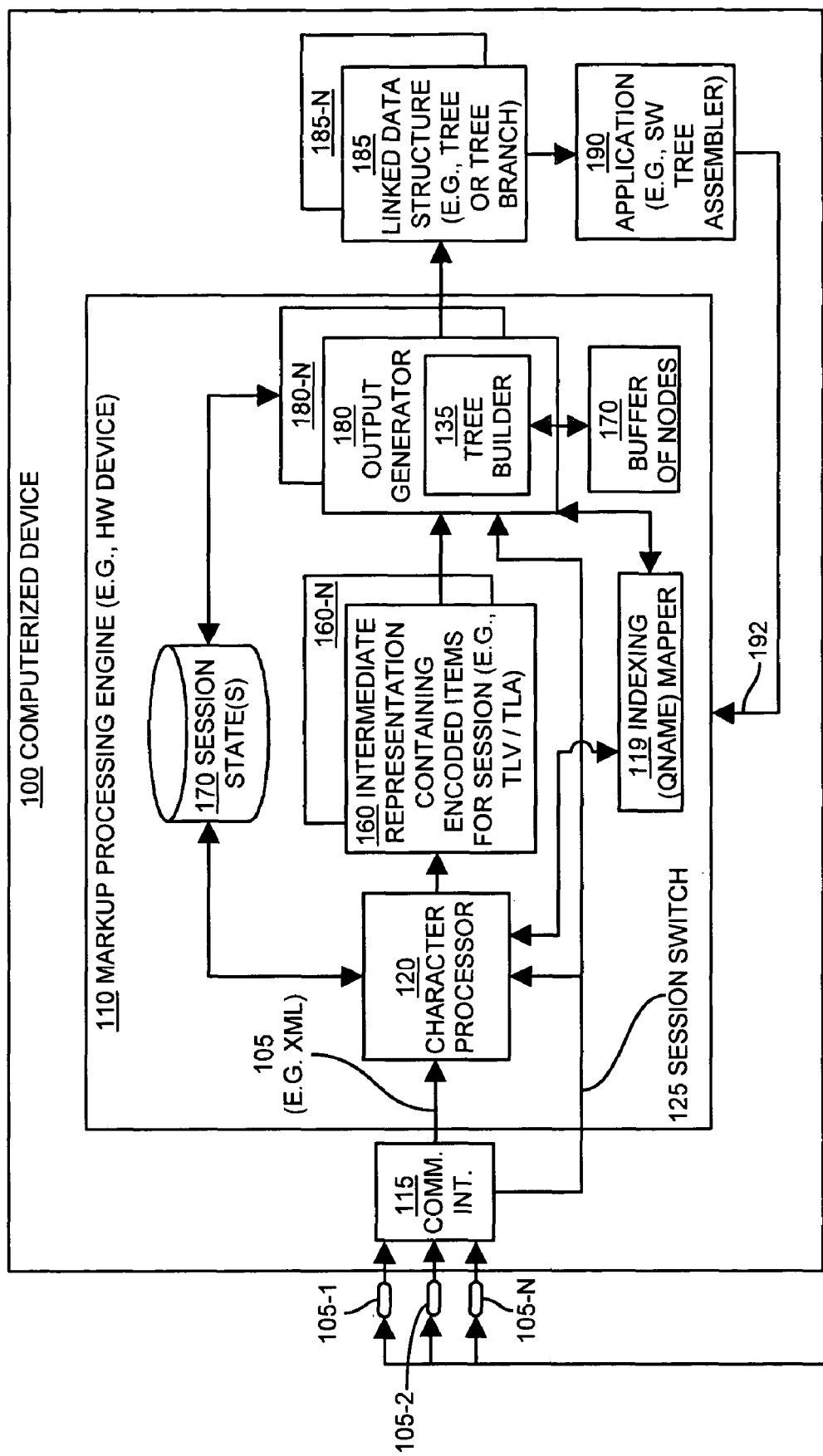
FIG. 1 illustrates an example of a computerized device including a markup language processor 110 operating an output generator configured according to one embodiment of the invention.

FIG. 1 illustrates an example architecture of a computerized device 100 that includes a markup processing engine 110 configured in accordance with embodiments of the invention. The computerized device 110 includes a communications interface 115 that may be coupled to a communications network 101 such as the Internet, or a local or wide area network (LAN or WAN). The computerized device 110 in this example receives a plurality of character streams of markup language data 105-1 through 105-N from the network 101, each of which is associated with a respective markup processing session. As an example, the character streams of markup language data 105-1 through 105-N may be received by the communications interface 115 within the computerized device 110 as sequences of packets over respective communications sessions such as Transmission Control Protocol (TCP)/Internet Protocol (IP) sessions from remote computer systems (not specifically shown). Alternatively, any type of communications protocol or method can provide one or more streams of markup language data to the computerized device 110 for receipt by a markup processing engine 110 that embodies the invention in this example. An application 190 can be the recipient process that loads the XML data from the streams into a local memory within the computerized device 100. Examples of the application 190 can be a user software process that requires access to portions of the XML data stream 105 or a hardware process or circuit within the markup processing device. The tree building processing of this invention can produce a linked data structure 185 as a series of buffers that collectively for a tree. The application 190 accepts each buffer as a segment or branch of the tree 185.

The communications interface 115 may be any type of network port or software interface or other type of data interface capable of receiving the streams of markup language data 105. In this example, the communications interface 115 forwards at least one character stream of markup language data 105 to the markup processing engine 110 for processing as explained herein. This may be done under control of the application 190. As will be explained later, the communications interface 115 in this example (or the application 190) is capable of indicating (e.g., via access to information in a data communications protocol stack, or via data maintained by the application 190) to the markup processing engine 110 which particular markup language data communications session (i.e., which particular character stream 105-1 through 105-N) is currently being provided to the markup processing engine 110 at any point in time. This is accomplished via the session switch event 125 in the illustrated example. The session switch event 125 may be an identity of a particular data communications session to which the XML character stream 105 is associated and each session 105-1 through 105-N can have its own identity to allow the markup processing engine 110 to maintain session state 170 for each markup language session 105. The session switch event may be control by the application 190 in alternative embodiments.

In this example, the markup processing engine 110 is a hardware device such as an add-on board or card that can be configured within the computerized device 100 to receive and process the incoming streams of markup language data 105-1 through 105-N. The application 190 such as a software application may execute within the computerized device 100 (e.g., on a central processing unit, not shown in this example) and may operate in conjunction with the markup processing engine 110 in order to receive a linked data structure 185 such as a tree or tree branch (as will be explained) produced from the original markup language input 105 by the processing provided by embodiments of the invention. While not shown in this example, the application 190 may provide the initial stream 105 of markup language data 105 to the markup processing engine 110 as well. In this manner, the application 190 can input XML data 105 to the markup processing engine 110 that converts this data to the linked data structure 185, such as a tree, that allows the application 190 to access and manipulate constructs within the original markup language input 105 in an efficient manner.

The markup processing engine 110 includes, in this example, a character processor 120 and an output generator 180 configured with a tree builder mechanism 135 that operates to produce the linked data structure 185. An indexing mapper or QNAME engine 119 is provided that generates strings for certain input data form the stream 105 in order to allow fast lookups of data within the linked data structure 185, as will be explained. Generally, the character processor receives incoming streams of markup language data 105-1 through 105-N such as XML data streams for different XML documents and converts the XML data 105 in each stream into a respective intermediate representation 160-1 through 160-N (one intermediate representation for each different session) containing encoded items. Co-pending U.S. patent application referenced above as Ser. No. 10/883,018 discloses a markup language processing device within which embodiments of the present disclosed invention may operate (i.e., as the generator 50 and tree builder in that application). Specific details of operation of a character processor 120 that produces, as output, the intermediate representation 160 that can be used as input to the output generator 180 operating in accordance with embodiments of the present invention is disclosed in co-pending U.S. patent application referenced above as Ser. No. 10/883,484. Specific details of operation of a QNAME engine or indexing mapper 119 that can be used to control filtering and operation of the tree builder is disclosed in co-pending U.S. patent application referenced above as Ser. No. 10/883,016.

Figure 2:
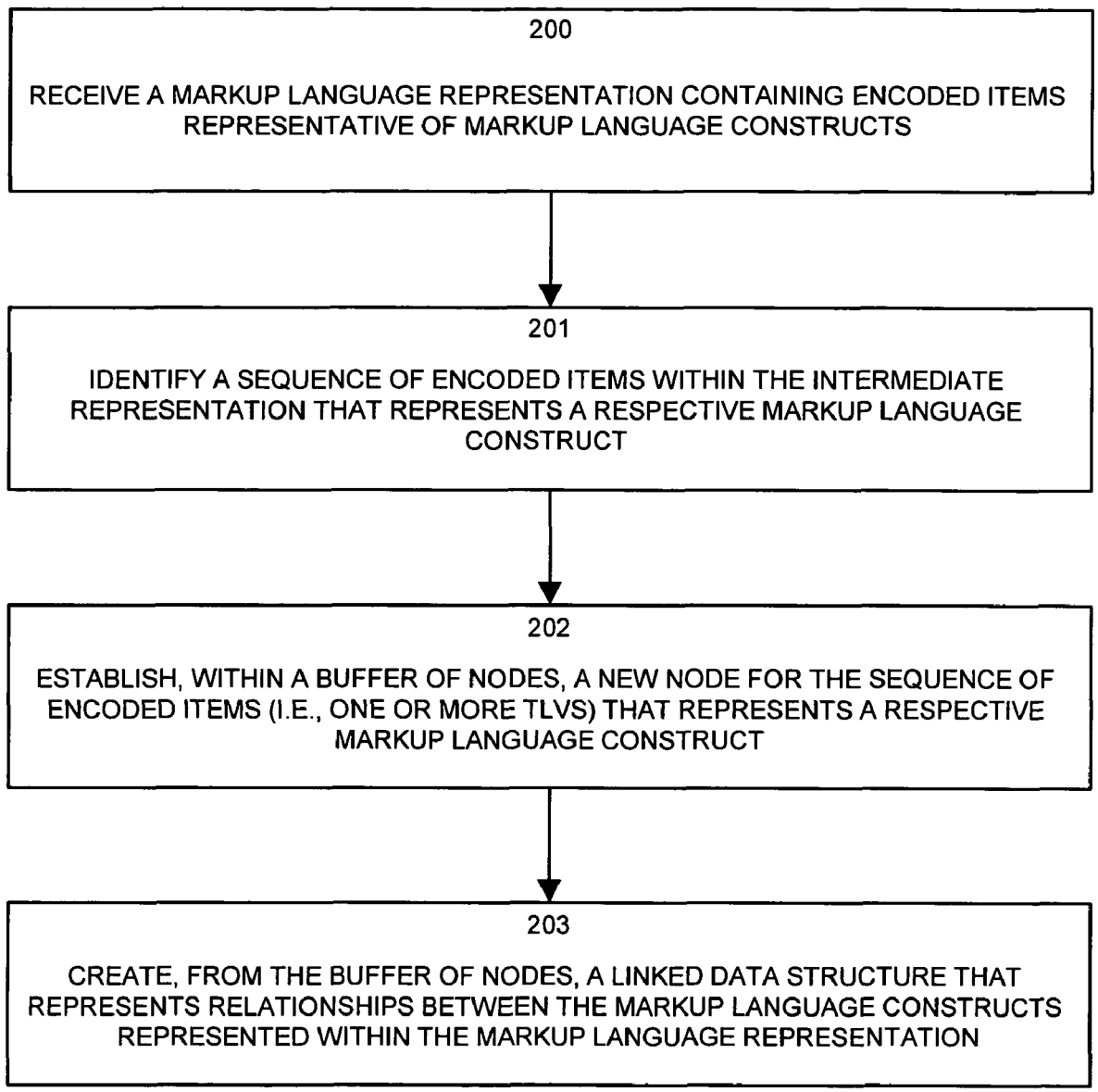
FIG. 2 is a flow chart of processing steps that show operation of an output generator configured to process an intermediate representation of markup language data in accordance with embodiments of the invention.

FIG. 2 is a flowchart of high level processing steps that an output generator 180 configured with a tree builder 135 performs in accordance with one example embodiment of the invention to convert a markup language representation 160 to a linked data structure format 185 such as a tree containing representations of constructs in the markup language representation 160 from FIG. 1.

In step 200, the output generator 180 receives a markup language representation 160 containing encoded items representative of markup language constructs. In one configuration, the intermediate representation 160 comprises encoded items received as a stream, or individually, that each contain type, length, value (TLV) or type, length, attribute (TLA) representations of the XML constructs identified by application of the sequences of characters of the character stream 105 to a set of state machines (not shown in this figure) operating within the character processor 120. As a result, the character processor 120 converts a stream of XML data (i.e., an XML document) 105 into a corresponding TLV or TLA representation 160 for subsequent processing as input to the output generator 180, as explained herein, for creation of the linked data structure format 185, such as a tree, for access by the application 190.

In step 201, the output generator 180 identifies a sequence of encoded items within the intermediate representation 160 that represents a respective markup language construct. The TLV intermediate representation 160 provides a set of "Types" that generally correspond to the different types of XML constructs that are encountered within character streams 105 of XML markup language data assuming the markup language data is formatted according to a standardized XML markup language specification. In alternative configurations, the set of types can be configured to correspond to constructs of different markup languages other than XML, such as HTML, SGML or another markup language. However, for purposes of description of embodiments of the invention, the set of types available for TLV encoded item input 160 in one example embodiment are used for representation of XML and generally correspond to the following XML construct types:

1. Start tag prefix
2. Start tag local part
3. End tag prefix
4. End tag local part
5. Empty element
6. PI target
7. PI Data
8. Comment
9. Attribute name prefix
10. Attribute name local part
11. Attribute Value
12. XML version number
13. XML encoding value
14. XML declaration standalone value
15. Text
16. DTD Name
17. DTD Public ID
18. DTD System ID
19. DTD Subset
20. Entity
21. Close Start Element
22. Namespace prefix
23. Namespace URI
24. Unnecessary Whitespace Example List of TLV "Types" for Representing
XML Constructs for Input to the Output Generator Accordingly, by identifying the "Type" portion of one or more TLVs in the intermediate representation 160, the output generator 180 can identify specific types of markup language constructs.

Next, in step 202, the output generator 180 establishes, within a buffer of nodes 170, a new node for the sequence of encoded items that represents a respective markup language construct. Complete details of creation of a new node will be explained shortly. Generally however, for certain types of constructs encountered within the TLV input 160, the output generator 180 creates a node for entry into a buffer of nodes that form the linked tree data structure 185. There are 5 XML syntax types or constructs (Elements, Attributes, Comments, PI statements, Text) that can occur that result in creation of nodes in a document's linked data structure tree 185. In particular, XML comment & text constructs have the same node structure, and XML attributes, elements and PI statements each have their own structure.

Each node has a collection of data fields to provide information about the construct represented by that node. Some nodes include references to data or values associated with the node. The output generator forms a tree of nodes by setting pointers, links, memory references, or other equivalent associations to other related nodes (e.g., parent, child and siblings) in the buffer of nodes or in the tree linked data structure 185. These references to related nodes allow the linked data structure 185 in one embodiment to have a substantially hierarchical structure. Fields common to all tree nodes in one configuration are Type, flags, parent pointer, sibling forward pointer, sibling reverse pointer.

In addition, some nodes include a numeric representation field that in one embodiments is a "QNAME." A QNAME is a numeric representation of the data or value of a node and allows an application 190 that access the linked data structure 185 to quickly perform comparisons and searches for data in the tree. Other nodes, such as attribute nodes, have a QNAME as well as a value pointer to reference a secondary buffer that holds that actual data, value or content of the original XML encoded application data. Likewise, element nodes have fields for QNAME, child pointer, namespace pointer and an attribute pointer. PI statements have a QNAME field and a value pointer. The indexing mapper or QNAME engine 119, during parsing of the input stream 105, generates QNAMES. Generally then, instead of each node in the tree storing large strings of information that the application 190 will requires access to (and searching of), QNAMES are numeric representations, such as hashes, of string data (and other information, as will be explained) and are stored within nodes in the data structure 185 and allow the software to quickly search the data structure 185 using numeric compares that are faster than string compares. Text and Comment nodes have a value pointer field. More specific details of nodes and their respective content, creation and linking will be explained shortly.

In step 203, the output generator 180 creates, from the buffer of nodes 170, the linked data structure 185 that represents relationships between the markup language constructs represented within the markup language representation 160 (and in the original markup language document or stream 105). In one configuration, the output generator 180 creates a tree data structure from the buffer of nodes. The tree data structure contains linked nodes that represent a hierarchical relationship existing between the markup language constructs represented within the markup language representation 160 (and 105).

As explained above then, the tree builder 135 thus processes XML documents 105-1 through 105-N represented as intermediate representations 160-1 through 160-N and converts this information to trees 185-1 through 185-N based on the input document's structure and data. In one configuration, the application 190 receives the XML document from the network, and the application 190 can opens a "session" 105 to the markup processing engine 110 by providing 192 a session ID and a set of information about how that document 105 is to be processed to the markup processing engine 110. The application 190 can also specify what type of output should be emitted. Choices are tree 185, or the TLV intermediate representation 160. For purposes of this invention, the creation and output of the tree linked data structure 185 is the focus of this invention. The application 190 can send the markup processing engine 110 the message 192 with the physical address of where the XML data resides in memory and the session ID for the XML data stream 105. The markup processing engine 110 fetches the XML document from system memory over the PCI/PCI-X bus as an XML data stream 105, and puts it into local memory within the markup processing engine 110 (e.g., on a PCI mezzanine card). Once a block of XML data has been put in local memory, the markup processing engine 110 begins processing this data. In this manner, embodiments of the invention allow creation of a tree or other link data structure from XML data for access by the application 190.

Prior to further description of the detailed operation of the output generator 180 and tree builder 135 in accordance with various embodiments of the invention, a brief example of XML constructs that the character processor 120 converts to corresponding TLV sequences is provided below to provide a more complete understanding of TLV encoded items representing, for example, XML. As the character processor 120 operates as explained in the former referenced patent application (Ser. No. 10/883,484), the character processor 120 encounters XML constructs within a character stream 105 of XML markup language data and identifies the specific construct and produces appropriate TLVs containing codes or strings associated with the aforementioned XML construct "Types". For some TLVs, the character processor 120 obtains a portion of the XML character stream of data corresponding to the identified construct as a "Value" portion. The character processor establishes or calculates the "Length" field "L" of the TLV to be equal to the number of alphanumeric characters within the "Value" portion copied, obtained or otherwise extracted from the character stream of markup language data. In other words, for each XML construct identified in the character stream of markup language data, the character processor produces a sequence of one or more TLV encoded items 160 containing types selected from the list above, and each includes a length field indicating how many alphanumeric characters are contained in the value field. The character processor places the appropriate characters representing the identified construct within the value field. In some cases, the value field will be null and only the type and length fields are used, as in the case, for example, of a TLV that represents the close or "end" of a start element or an empty element. In other configurations, the value field is a pointer to a buffer of memory that contains the actual value or data, and the value field is a reference pointer, link or other association to this buffer containing the actual value or data. Those familiar with XML syntax and structuring constructs will readily identify the various XML constructs in the list of TLV Types given above.

The following example of XML inputs show samples of different types of actual XML constructs containing data and their corresponding TLV encoded item equivalents 160 as produced by a character processor 120 for input into the output generator 180 configured in accordance with embodiments of the invention:

DTD TLVs:
    XML input:
        <!DOCTYPE dtdname SYSTEM xyz_literal [random data]>
    TLV equivalent:

| TYPE | Length | Value |
|---|---|---|
| DTD Name | 7 | dtdname |
| DTD System URI | 11 | xyz_literal |
| DTD subset | 11 | random data |

XML Declaration TLVs:
    XML input:
        <?xml version='1.0' encoding='UTF-8' standalone='no'?>
    TLV equivalent:

| TYPE | Length | Value |
|---|---|---|
| XML version | 3 | 1.0 |
| XML Encoding | 5 | UTF-8 |
| XML standalone | 2 | no |

Comment TLVs:
    XML input:
        <!—This is a comment—>
    TLV equivalent:

| TYPE | Length | Value |
|---|---|---|
| Comment | 17 | This is a comment |

PI TLVs:
    XML input:
        <?proc_inst data_for_instruction?>
    TLV equivalent:

| TYPE      | Length | Value                |
|-----------|--------|----------------------|
| PI Target | 9      | proc_inst            |
| PI Data   | 20     | data_for_instruction |

Element & Attribute TLVs:
 XML input:
  <rtz:elem_name qre:attr1='123_value'>
 TLV equivalent:

| TYPE                  | Length | Value     |
|-----------------------|--------|-----------|
| Start Tag Prefix      | 3      | rtz       |
| Start Tag Local Part  | 9      | elem_name |
| Attribute name prefix | 3      | qre       |
| Attribute name suffix | 5      | attr1     |
| Attribute value       | 9      | 123_value |
| Close Start element   | 0      |           |

Namespace & Empty Element TLVs:
 XML input:
  <root xmlns:trhjj='http://www.xyz.com'/>
 TLV equivalent:

| TYPE                 | Length | Value              |
|----------------------|--------|--------------------|
| Start Tag Local Part | 4      | root               |
| Namespace prefix     | 5      | trhjj              |
| Namespace URI        | 18     | http://www.xyz.com |
| Empty Element        | 0      |                    |

Content & Entity TLVs:
 XML input:
  &hyzz78; text and entity
 TLV equivalent:

| TYPE   | Length | Value           |
|--------|--------|-----------------|
| Entity | 6      | hyzz78          |
| Text   | 16     | text and entity |

*Note:
Unnecessary white space TLV is content that has only Linefeeds, tabs, spaces or carriage returns.

In one configuration, TLVs are of variable length, depending on how many bytes of data the "value" contains. The type and length field are fixed size at 1 byte each. In other configurations however, TLVs are fixed length to avoid having TLVs crossing memory buffer boundaries and to avoid fragmentations and buffer recycling issues. For fixed length TLVs, they can be eight bytes long and text and value data is stored in a different buffer from the TLVs and is referenced by a pointer as the "value" field. The "length" field in the fixed length TLV implementation represents the length of the data being pointed at. The following table shows the various TLV types that the output generator 1 in accordance with one embodiments of the invention.

| TYPE                         | Encoding (bits 6:0) |
|------------------------------|---------------------|
| XML version                  | 00                  |
| XML Encoding                 | 01                  |
| XML Standalone               | 02                  |
| Comment                      | 04                  |
| PI Target                    | 08                  |
| PI Data                      | 09                  |
| Start Element Prefix         | 10                  |
| Start Element Local/NS       | 11                  |
| Empty Element                | 12                  |
| Empty element - NS resolved  | 32                  |
| Close start element          | 13                  |
| Close SE - NS resolved       | 33                  |
| End Element Prefix unchecked | 20                  |
| End Element unchecked        | 21                  |
| End Element Prefix checked   | 22                  |
| End Element checked          | 23                  |
| Attribute Name Prefix        | 18                  |
| Attribute Name               | 19                  |
| Attribute Value              | 14                  |
| NameSpace URI                | 15                  |
| NameSpace prefix             | 16                  |
| Entity                       | 17                  |
| Content                      | 0A                  |
| Unnecessary Whitespace       | 0B                  |
| DTD Name                     | 40                  |
| DTD Public URI               | 42                  |
| DTD System URI               | 43                  |
| DTD stuff in [ ]             | 44                  |
| QCODE - prefix               | 34                  |
| QCODE - suffix               | 38                  |
| QCODE - URI                  | 3c                  |
| Node value pointer           | 0C                  |

Example TLV Types

Figure 3:
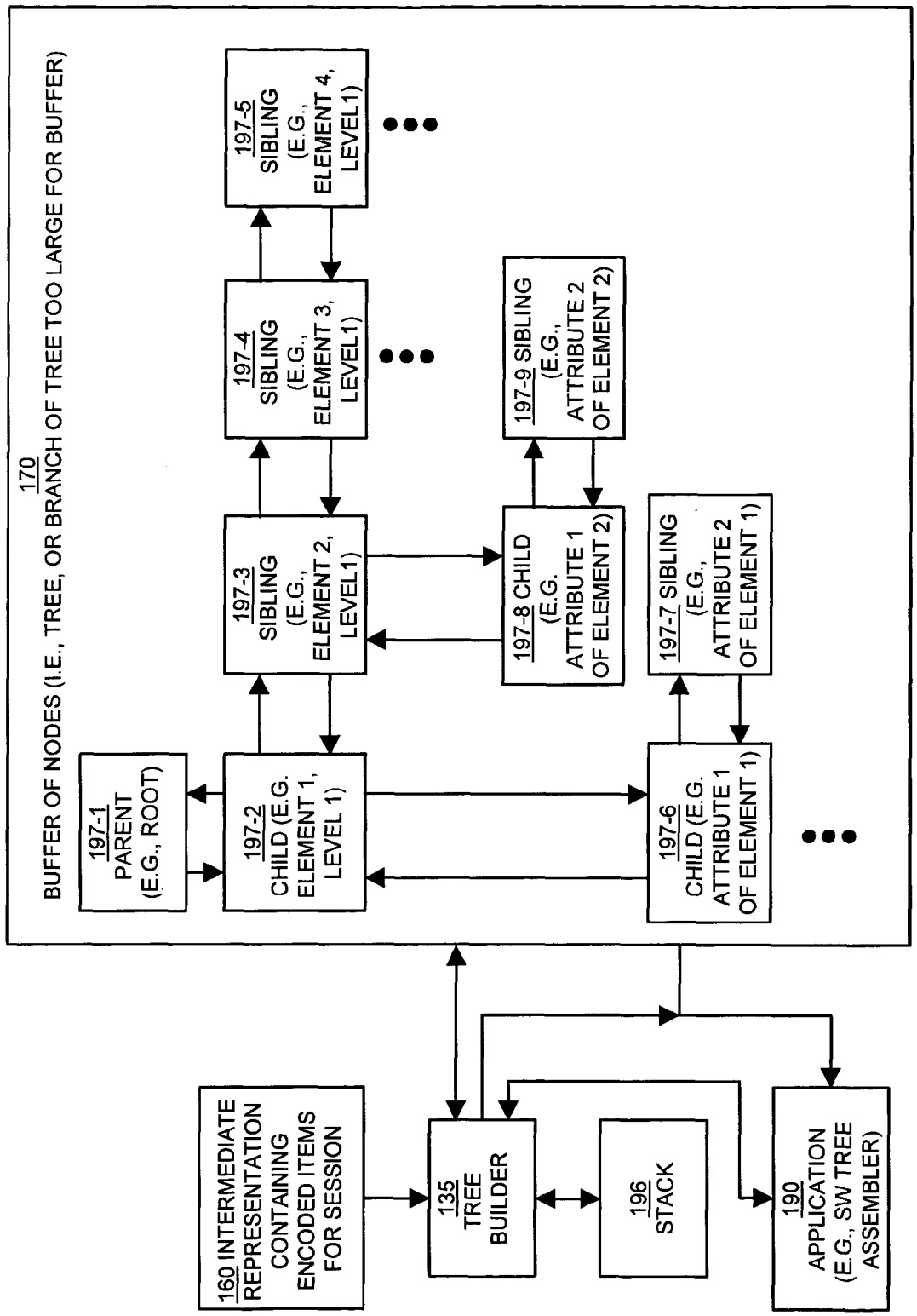
FIG. 3 is a data flow diagram indicating how the tree builder operates to create buffers of nodes for a tree in accordance with one embodiment of the invention.

FIG. 3 illustrates an organization and data flow of node 197 and tree 185 creation using a buffer of nodes 170. As illustrated, he tree builder 135 operating within the output generator 180 receives the intermediate representation of the markup language data 160. As will be explained shortly, in response to certain types or sequences of TLVs in the representation 160, the tree builder 135 allocate nodes 197 that maintain information concerning XML constructs represented by the TLVs. The tree builder 135 allocates the buffer of nodes 170, and allocates and populates nodes 197 in the buffer and links the nodes 197 with parent 210, child 212, and sibling forward 214 and sibling reverse 216 pointers that allow the nodes to represent the inherent hierarchical structure of the original XML input data 105 (FIG. 1). As will be explained, the tree builder 135 maintains and uses a stack 196 to track parent and child levels for nodes in the hierarchy expressed in the TLV sequences of elements, attributes, PI statements, and text or comment constructs. If the buffer of nodes 170 becomes full, the tree builder 135 provides the buffer of nodes 170, via data flow 199, to the application 190 for insertion as a branch into the tree linked data structure 185. It is noted that the receiver of the linked data structure portions (i.e., buffers of nodes that form a tree) does not have to be a application 190 as shown in the example in FIG. 1. In other configurations, other hardware processing can receive the buffers of nodes (i.e., the linked data structure 185, received as a series of buffers of linked nodes) for further processing. In this illustrated configuration however, the application 190 maintains and builds the tree by receiving segments or branches of the tree 185 as populated buffers of nodes 170 from the tree builder 135. Each time a branch (i.e., a full buffer of nodes 170) is passed to the application for insertion in the tree 185, the tree builder can allocate a new buffer of nodes 170 and can continue to populate this new buffer with new nodes 197 by continuing to process sequences of TLVs within the intermediate representation 160. Further details of the processing and data flow shown in FIG. 3 will now be explained via the flow charts in FIGS. 4 through 10.

FIGS. 4 through 10 provide flow charts of detailed processing that takes place within the high level processing operation discussed above the flow chart in FIG. 2 in accordance with embodiments of the invention. Steps or operations shown as nested boxes within other boxed steps or operations indicate sub-steps of the outer-boxed step or operation.

Figure 4:
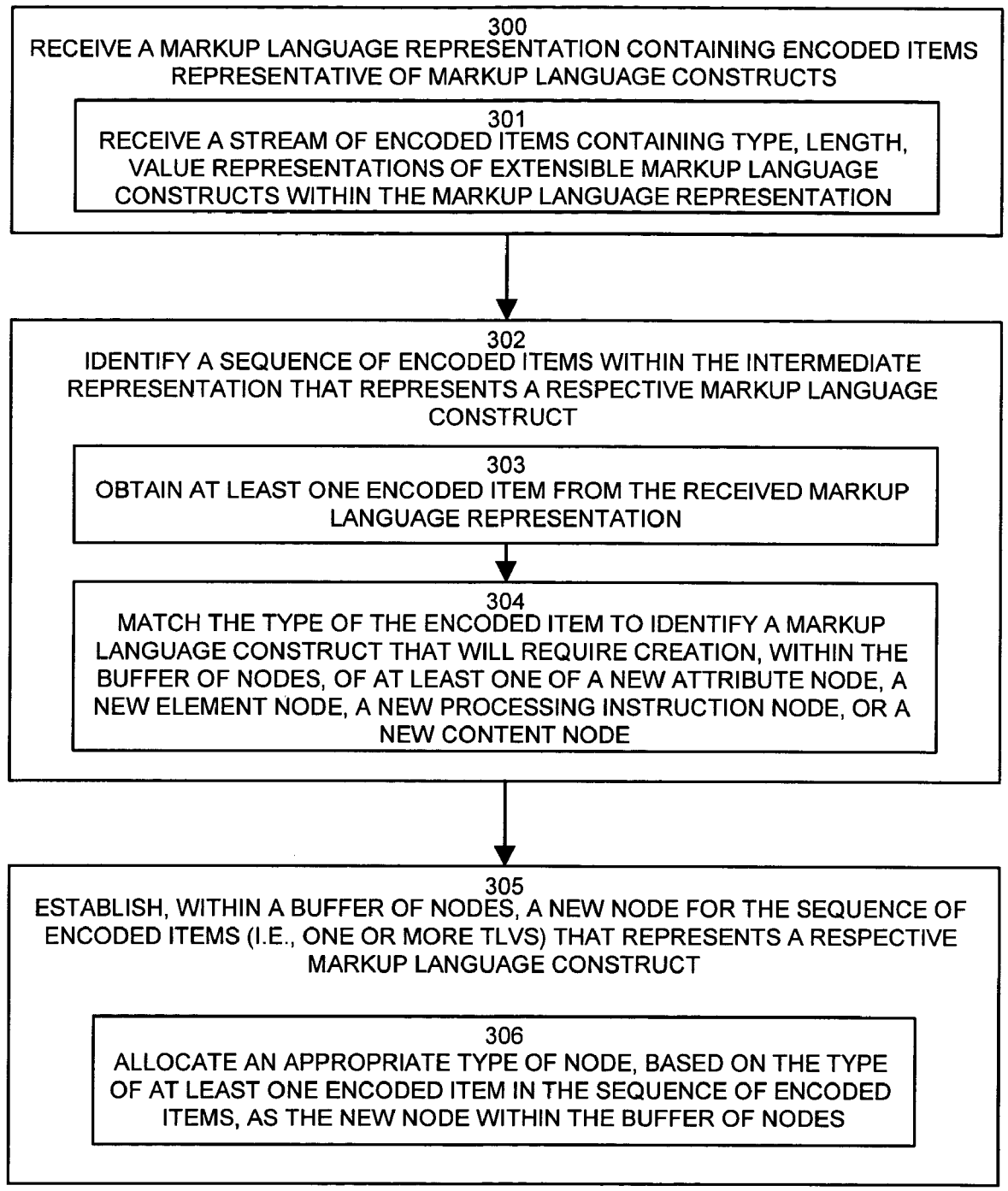
FIG. 4 is a flow chart of processing steps that show details of processing of the intermediate representation of markup language data by an output generator operating in accordance with one example embodiment of the invention.

In FIG. 4, in step 300, the output generator 180 receives a markup language representation containing encoded items representative of markup language constructs as explained above in step 200 of FIG. 2.

In particular, in sub-step 301, the output generator receives a stream of encoded items containing type, length, value (TLV) representations of extensible markup language constructs within the markup language representation 160. Depending upon the implementation, the value portion of TLVs may be either an actual character string as obtained from the XML input stream 105, or alternatively may be a reference such as an address or pointer to a memory location containing data.

In step 302, the output generator 180 identifies a sequence of encoded items within the intermediate representation that represents a respective markup language construct (as in step 201 in FIG. 2).

In sub-step 303, the output generator 180 obtains at least one encoded item from the received markup language representation. In one embodiment, each TLV is decoded and a determination is made if a node in the tree should be created from that TLV. Alternatively, it is noted that the output generator may obtain a group or sequence of multiple TLVs and may collectively operate on this sequence to generate a node.

In sub-step 304, the output generator 180 matches the type of the encoded item to identify a markup language construct that will require creation, within the buffer of nodes 170, of either a new attribute node, a new element node, a new processing instruction node, or a new content node.

Next, in step 305, the output generator 180 establishes, within a buffer of nodes 170, a new node for the sequence of encoded items (i.e., one or more TLVs) that represents a respective markup language construct.

In sub-step 306, the output generator 180 allocates an appropriate type of node, based on the type of at least one encoded item in the sequence of encoded items, as the new node within the buffer of nodes 179. Further details of creation and allocation of a new node and its contents will now be discussed with respect to the remaining flow chart figures.

Figure 5:
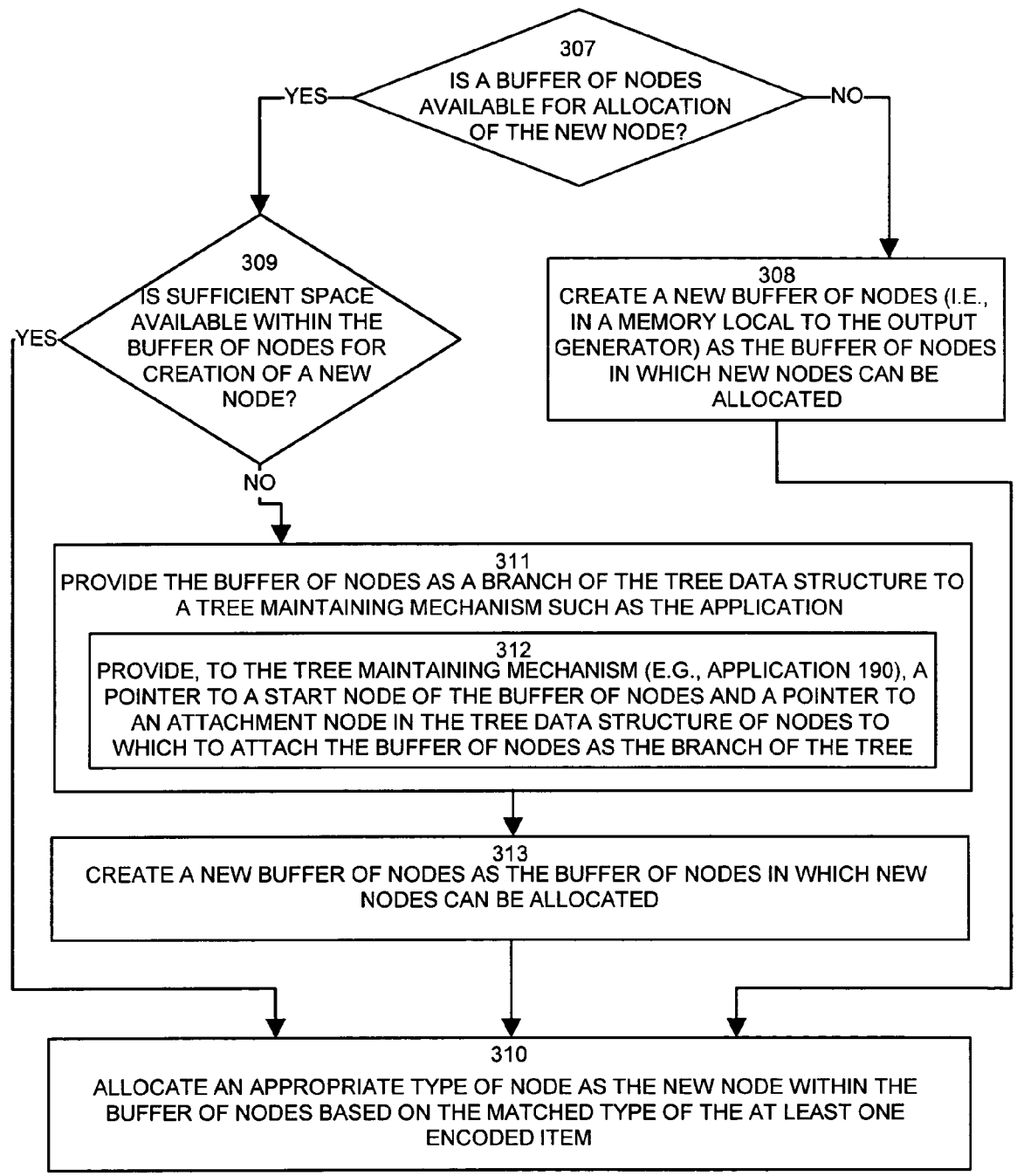
FIG. 5 is a flow chart of processing steps that show details of buffer management processing by an output generator operating in accordance with one example embodiment of the invention.

FIG. 5 is a flow chart of processing steps that the output generator 180 performs for buffer management during creation of new nodes 197 within the buffer of nodes 170.

In step 307, the output generator 180 determines if a buffer of nodes 170 is available for allocation of the new node. It may be the case that no buffer 170 is presently allocated, such as when the stream of TLVs from the intermediate representation 160 first begins to arrive for processing by the output generator 180.

If not, then in step 308 the output generator 180 creates a new buffer of nodes 170 (i.e., in a memory local to the output generator 180) as the buffer of nodes 170 in which new nodes can be allocated. This can be done in hardware, or via a signal to the application 190 to perform a memory allocation (e.g., malloc) instruction to allocate more memory for the buffer of nodes 170.

In step 309, if a buffer of nodes is available for allocation of the new node 197, then the output generator 180 determines if sufficient space is available within the buffer of nodes 170 for creation of a new node 197.

In step 310, if sufficient space is available within the buffer of nodes 170 for creation of a new node 197, then the output generator 180 allocates an appropriate type of node as the new node 197 within the buffer of nodes 170 based on the matched type of the at least one encoded item.

In step 311, if sufficient space is not available within the buffer of nodes 170 for creation of a new node 187, the output generator 180 provides the buffer of nodes 170 as a branch of the tree data structure 185 to a tree maintaining mechanism such as the application 190.

In sub-step 312, in particular, the output generator 180 provides, to the tree maintaining mechanism (e.g., application 190), a pointer to a start node (e.g., 197-1, the root node in the example in FIG. 3) of the buffer of nodes 170 and a pointer to an attachment node (i.e., a node already in the tree 185, null if this is the first branch) in the tree data structure of nodes to which to attach the buffer of nodes as the branch of the tree 185. In this manner, the hardware can operate on a buffer of nodes 170 that does not grow to be too large. Once full, the output generator in hardware can signal to software 190 that the buffer is now ready for insertion into the tree 185 as a branch.

In step 313, since a new buffer is allocated on this path, the output generator 180 creates a new buffer of nodes 170 as the buffer of nodes in which new nodes 197 can be allocated.

Based on the aforementioned processing, in one embodiment of the invention, the primary means of sending data between the hardware on the markup-processing engine 110 and the application 190 is via buffers 170 in system memory on the computerized device 100. When XML data is ready for processing, the software 190 sends 192 a pointer to the markup processing engine 110 indicating the location of the XML data in memory. When a tree 185 is built, the tree 185 needs to reside, in one embodiment, in system memory so that the software 190 has fast, low latency access to the tree 185. However, the hardware may not have access to classic memory allocation mechanisms like "malloc", and embodiments of the invention are designed to not incur the delay of waiting for software to allocate memory each time space for node creation is needed. As such, in embodiments of the invention, the application 190 pre-allocates a group of fixed-size buffers 170 in memory and hands both the virtual and physical address of each buffer to the hardware. The hardware will use these buffers 170 for building the trees. As buffers 170 are used, the software 190 will replenish the pool with new ones.

As an example, if the following XML is presented as a stream of TLVs to the output generator 180:

XML document:

<root><child1>abc</child1></root>

The output generator 180 creates a tree of nodes 197 that appears as:

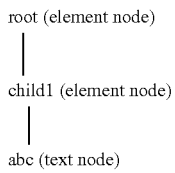

The markup processing engine 110 might represent these nodes in the system memory as follows:
Buffer physical address: 0x30e61000
Virtual address: 0x6000

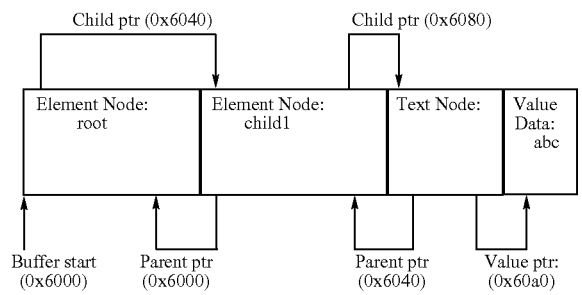

Example Buffer Arrangement for Nodes

As such, when the tree 185 is built, the tree building engine 135 uses the buffer's virtual address to connect the parent & child node pointers as shown above, but when transferring the data over a bus such as a PCI bus, the output generator 180 uses the physical address so the data goes to the appropriate place in system memory.

One problem with building trees in predefined buffers occurs when the space required exceeds the buffer size. When building a tree in a buffer 170, the hardware engine tree builder 135 places as many nodes 197 into the buffer 170 as possible. When a buffer 170 is filled, the tree builder 135 returns the buffer 170 to software indicating this is branch of the tree 185 and indicating where this branch goes via a pointer to the last node of the last branch previously passed to the software 190. For example, the hardware-based markup processing engine 110 indicates the buffer 170 is the root of the tree 185. If it is not, the tree builder 135 tells the software 190 via signal 199 that this buffer 170 represents a tree branch, and the tree builder 135 gives the virtual address of the tree node 197 where the branch needs to be linked into the tree. Each linked data structure 185 passed form the output generator can thus be a buffer of linked nodes that forms a mini-tree that can be a branch of a larger tree that the application 190 assembles using pointers from the tree builder 135 that indicate where this branch is to be linked into the larger overall linked data structure 185. Depending on the size of the input stream 105, there may be one buffer (e.g., in the case of a small number of nodes) that forms the entire linked data structure 185, or the linked data structure 185 may be formed from a series of several buffers of linked nodes. In such a case, the software then manipulates the pointers in the existing tree 185 in order to point to the new branch of a node in each new buffer 170 produced by the tree builder 135. The hardware-based markup-processing engine 110 has at that point already put the parent pointer into the new tree branch of the newly allocated buffer 170. Having software 190 hooking "tree branches" together in one configuration helps simplify the hardware-based markup processing engine 110 because the hardware 110 only needs to remember the stack of element nodes 196 (as will be explained), and it does not have to keep the entire tree 185 in local memory. Also, this allows software 190 to use the tree 185 before it is completely built and provides a significant advantage of conventional XML processing systems such as the DOM. Note in alternative implementations where memory or buffer size is not an issue, the tree builder 135 can produce the entire linked data structure 185 in memory at one time without using multiple buffers.

In addition to allowing fixed sized buffers 170 to be handed to hardware 110, the multiple buffer solution also addresses the problem of what happens to the trees 185 if all of the data for an XML document is not obtained at one time in a session 105. When running in a networked environment, it is likely that many different network transactions will be active and that XML data for all of these sessions 105-1 through 105-N will be interleaved when being sent to the hardware-based markup processing engine 110 for processing. By having the ability to hand back or return pointers to partial trees as buffer 170 branches, the hardware 110 can switch between processing data and building trees for interleaved documents 105 or communications sessions. As such, the hardware-based markup processing engine 110 will not have to keep entire trees 185 in local memory for an unknown period of time. The session switch signal 125 can indicate to the tree builder 135 when the data stream changes from one document or stream 105 to another.

When the tree builder 135 returns the tree to software 190, the tree builder 135 sends a pointer 199 to the beginning of the buffer 170 and the session id (indicated by the session switch signal 125) of a session 105 with which the buffer 170 is associated. This piece of memory 170 is then associated with or sent to the correct application 190 so that the given application 190 automatically accesses the correct tree 185. As noted above, the application may be a hardware device or a software process. Thus there may be an intermediate software layer that multiplexes data buffers for multiple applications 190. It is important to note that in one embodiment, all tree accesses and manipulation is done using the buffers 170 handed back from hardware 110, and that they are not copied to another place in memory.

Although the previous example shows the "text data" (in the example, "abc") of a text node 197 being in the same buffer as the tree 185 itself, in most cases there is a separate buffer 170 which contains all of the text, attribute, comment, and PI data. When the character processor 120 is processing XML data, the character processor 120 null terminates each string and packs the data into a local memory sitting off the side of the markup processing engine 110. Thus the character processor 120 does not have to pass the text data (which could be large) as part of the TLV going to the tree builder 135. Instead, the character processor 120 can pass the length and a pointer, allowing smaller FPGA internal memory structures within the markup processing device 110. The tree builder 135 does not need the text data itself when building the tree 185, but instead can use a pointer to the data. In addition, when building the tree 185, by keeping the text data in a separate buffer, the copying and data alignment that would be required if the text were kept in the same structure as the tree are not required.

In other configurations, the output generator can be programmed to filter or process and produce trees or other output (such as the TLV stream) for all or only portions of the original input stream 105. Examples of how to control the output generator 180 via filtering commands such as XPATH expressions are disclosed in co-pending U.S. patent application referenced above as Ser. No. 10/883,016.

Figure 6:
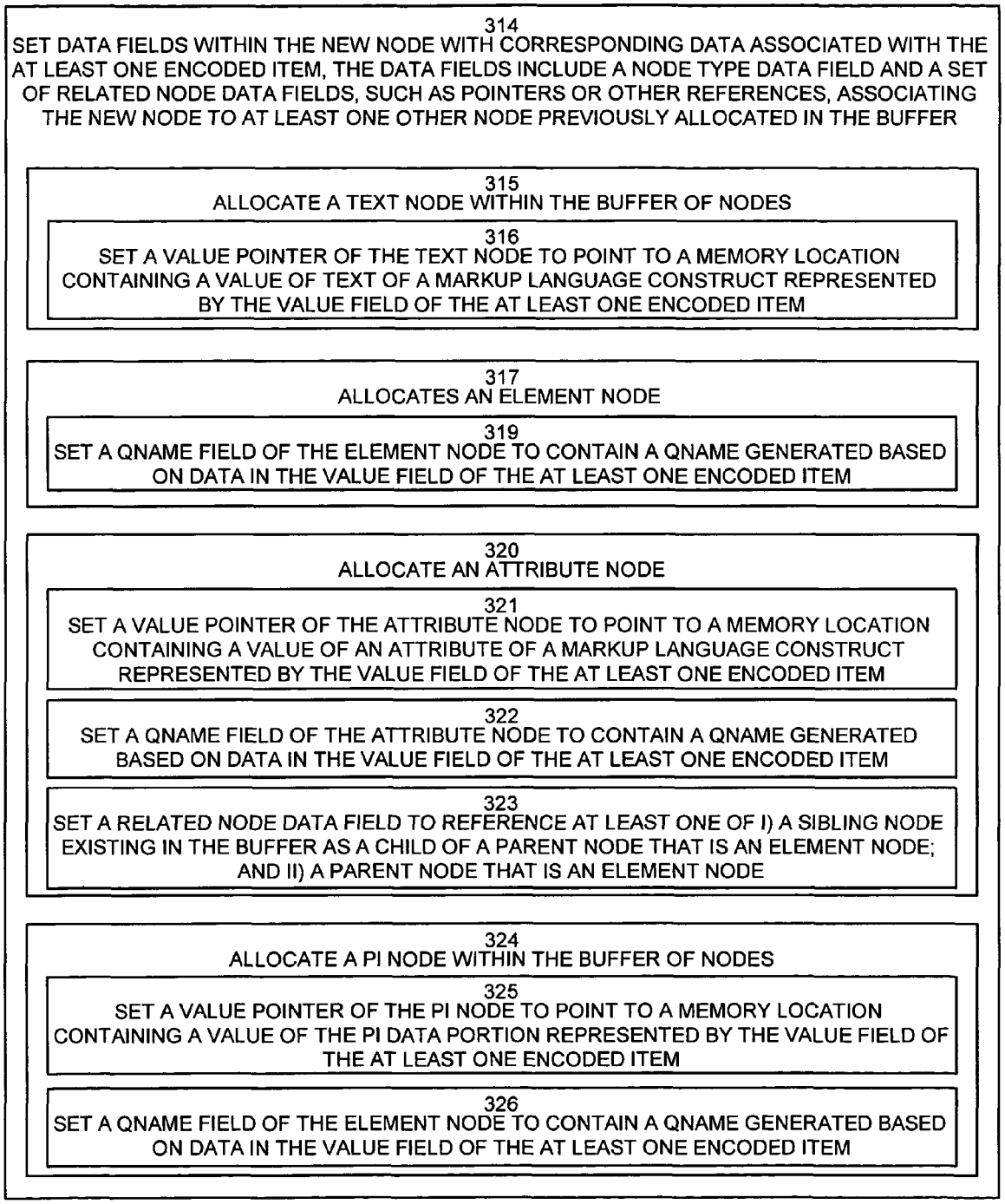
FIG. 6 is a flow chart of processing steps that show details of processing for node allocation in a buffer of nodes for use in a tree by an output generator operating in accordance with one example embodiment of the invention.

FIG. 6 is a flow chart of processing steps that the output generator 180 performs for creation of new nodes 197 within the buffer of nodes 170 in accordance with one embodiment of the invention.

In step 314, the output generator 180 sets data fields within the new node 197 (i.e., the newly allocated node) with corresponding data associated with the at least one encoded item. In one configuration, the data fields include a node type data field and a set of related node data fields, such as pointers or other references, associating the new node to at least one other node previously allocated in the buffer 170.

Depending upon when TLVs are encountered, there can be several different types of nodes 197 created in the tree. In particular, there can be element nodes, attribute nodes (that are typically child nodes of element nodes), PI statement nodes, and text and/or comment nodes. There are five XML syntax or constructs including Elements, Attributes, Comments, PI statements, and Text that result in creation of nodes 197 in a document's tree 185. Comments & Text have the same node structure. Attributes, Elements and PI statements each have their own structure. The fields common to all tree nodes are Type, flags, parent pointer, sibling forward pointer, sibling reverse pointer. In addition, attributes have fields for QNAME and a value pointer while Element nodes have fields for QNAME, child pointer, namespace pointer and an attribute pointer. PI statements have a QNAME field and a value pointer. Text and Comment nodes have a value pointer field.

Note that in some embodiments, the final desired node structure may include additional fields that are empty or null at the outset of processing by recipient 190 (software in the illustrated example). These fields may appear in any part of the node. If the application 190 had to subsequently allocate room for them, additional overhead of allocation and copying would be required. At the same time, if the hardware were required to maintain the empty fields in its structures, it would introduce an additional overhead. Instead, the output generator 180 can maintain a packed internal node structure that contains only the fields which it fills. At the final output direct memory access (DMA) step, the output generator 180 can produce the larger node structure with a different arrangements of fields and including the null fields. The following example node layout tables show example formats of nodes according to different embodiments of the invention.

Element Node Examples

| EMBODIMENT 1 | | | EMBODIMENT 2 | | |
|---|---|---|---|---|---|
| Type (8) | pad (8) | Flags (16 bits) | Type (8) | Prefix QCODE (16 bits) | flags (8) |
| Value Pointer (32 bits) | | | Parent Pointer (32 bits) | | |
| Parent Pointer (32 bits) | | | Doc Position (32 bits) | | |
| Doc Position (32 bits) | | | Sibling Pointer (32 bits) | | |
| Sibling Pointer (32 bits) | | | Sibling Reverse Pointer (32 bits) | | |
| Sibling Reverse Pointer (32 bits) | | | QNAME (32 bits) | | |
| Data (32 bits) | | | Namespace Binding Pointer (32 bits) | | |

-continued

| EMBODIMENT 1 | | | EMBODIMENT 2 | | |
|---|---|---|---|---|---|
| Type (8) | pad (8) | Flags (16 bits) | Type (8) | Prefix QCODE (16 bits) | flags (8) |
| QNAME (32 bits) | | | Document pointer (32 bits) | | |
| Namespace Binding Pointer (32 bits) | | | Attribute Pointer (32 bits) | | |
| Document Pointer (32 bits) | | | Child Pointer (32 bits) | | |
| _Hashtable Pointer (32 bits) | | | | | |
| Attribute Pointer (32 bits) | | | | | |
| Child Pointer (32 bits) | | | | | |

Type: ELEMENT (0x02)

DocPosition: session specific incrementing number

Document: preset value loaded by SW at session startup

Attribute/PI Node Examples

| Embodiment 1 | | |
|---|---|---|
| Type (8) | pad (8) | Flags (16 bits) |
| Value Pointer (32 bits) | | |
| Parent Pointer (32 bits) | | |
| Doc Position (32 bits) | | |
| Sibling Pointer (32 bits) | | |
| Sibling Reverse Pointer (32 bits) | | |
| Data (32 bits) | | |
| QNAME (32 bits) | | |
| Namespace Binding Pointer (32 bits) | | |

| Embodiment 2 | | |
|---|---|---|
| Type (8) | Prefix QCODE (16) | Flags (8 bits) |
| Value Pointer (32 bits) | | |
| Parent Pointer (32 bits) | | |
| Doc Position (32 bits) | | |
| Sibling Pointer (32 bits) | | |
| Sibling Reverse Pointer (32 bits) | | |
| QNAME (32 bits) | | |

TYPE: ATTRIBUTE (0x20) or PI (0x10)

DocPosition: session specific incrementing number

Text/Comment/TLV Node Examples

Embodiment 1

| Type (8) | pad (8) | Flags (16 bits) |
|---|---|---|
| Value Pointer (32 bits) | | |
| Parent Pointer (32 bits) | | |
| Doc Position (32 bits) | | |
| Sibling Pointer (32 bits) | | |
| Sibling Reverse Pointer (32 bits) | | |
| Data (32 bits) | | |

Embodiment 2

| Type (8) | pad (16) | Flags (8 bits) |
|---|---|---|
| Value Pointer (32 bits) | | |
| Parent Pointer (32 bits) | | |
| Doc Position (32 bits) | | |
| Sibling Pointer (32 bits) | | |
| Sibling Reverse Pointer (32 bits) | | |

TYPE: TEXT (0x4) or COMMENT (0x8)
DocPosition: session specific incrementing number Generally, in the above node examples, the TYPE field identifies what type of tree node is present. In one embodiment, there are several node types including element, PI, attribute, root, text, and comment nodes. The flags field is eight bits and flag field encoding indicates information about a node. As an example, flag field encodings can appear as follow in one configuration:

| Flag | CODE |
|---|---|
| ATT_TYPE_STRING (default) | 0x00 |
| WHITESPACE_NODE | 0x01 |
| NODE_FLAG_SPLIT_NAMESPACES | 0x02 |
| ATT_TYPE_QNAME | 0x04 |
| ATT_TYPE_EXPR | 0x08 |
| ATT_TYPE_SPECIAL | 0x0c |
| BASE64_CONVERTED | 0x10 |
| NODE_FLAG_XMLSPACE | 0x80 |

In FIG. 6, steps 315, 317, 320 and 324, and their respective sub-steps show the general processing operations performed to create each of these different types of nodes.

To create text or comment nodes, in step 315, the output generator 180 allocates a text node within the buffer of nodes. In step 316, the output generator 180 sets a value pointer of the text node to point to a memory location containing a value of text of a markup language construct represented by the value field of the at least one encoded item. Thus a text node includes a pointer to another buffer that actually contains the text or comment data.

To create element nodes, in step 317, the output generator 180 allocates an element node within the buffer of nodes. In step 319, the output generator 180 sets a QNAME field of the element node to contain a QNAME generated based on data in the value field of the at least one encoded item. As will be explained, a QNAME is a numeric representation of the data or value of the element and is used in place of the actual data in the node to speed up the process of searching the tree 185 by the application 190. QNAME creation is performed in conjunction with the QNAME engine 119 and will be explained in detail shortly.

To create attribute nodes, in step 320, the output generator 180 allocates an attribute node within the buffer of nodes. In step 321, the output generator 180 sets a value pointer of the attribute node to point to a memory location containing a value of an attribute of a markup language construct represented by the value field of the at least one encoded item. In step 322, the output generator 180 sets a QNAME field of the attribute node to contain a QNAME generated based on data in the value field of the at least one encoded item. Attribute nodes are typically child nodes of an element node. As such, in step 323, the output generator 180 sets a related node data field to reference at least one of i) a sibling node existing in the buffer as a child of a parent node that is an element node; and ii) a parent node that is an element node. In this manner, attribute nodes are related to elements nodes to which those attributes apply.

To create PI statement nodes, in step 324, the output generator 180 allocates a PI node within the buffer of nodes. In step 325, the output generator 180 sets a value pointer of the PI statement node to point to a memory location containing a value of the PI data portion of a markup language construct represented by the value field of the at least one encoded item. In step 326, the output generator 180 sets a QNAME field of the element node to contain a QNAME generated based on data in the value field of the at least one encoded item. In this manner, the output generator creates new nodes for TLV input.

Figure 7:
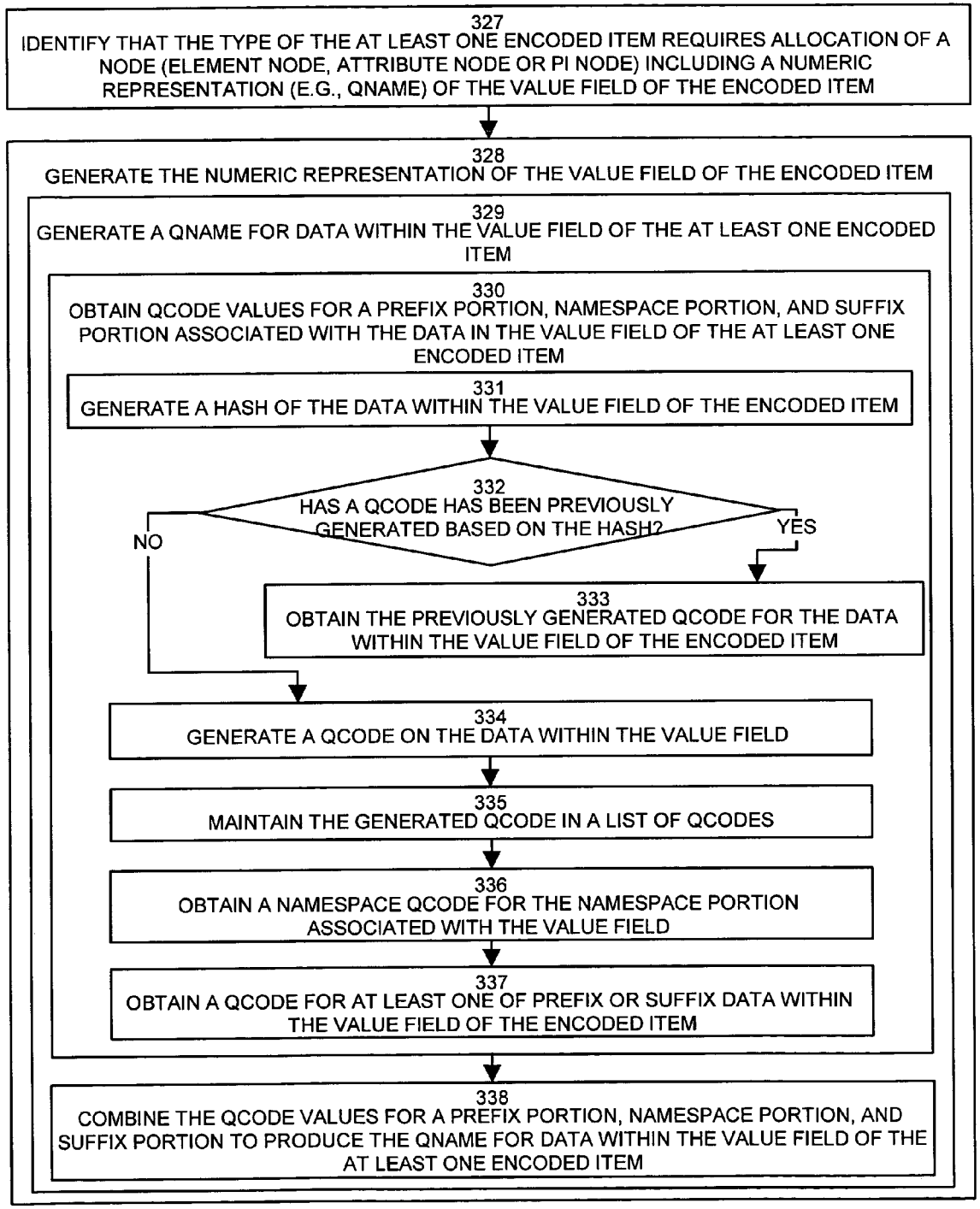
FIG. 7 is a flow chart of processing steps that show details of processing for creation of QNAME numeric representations of data values for nodes in a tree by an output generator operating in accordance with one example embodiment of the invention.

FIG. 7 show processing operations that the system of the invention performs to generate numeric representations such as QNAMES for element, attribute or PI nodes 197. QNAME management is performed in one embodiment by the indexing mapper or QNAME engine 119 in FIG. 1 that operates in conjunction with the output generator 180.

In step 327, the output generator 180 identifies that the type of at least one encoded item requires allocation of a node (element node, attribute node or PI node) including a numeric representation (e.g., QNAME) of the value field of the encoded item.

In step 328, the output generator 180 generates the numeric representation of the value field of the encoded item. This is done in one example embodiment via an interface to the QNAME engine 119. Details of numeric representation generation based on data or TLV value field information are shown in sub-steps 329 through 338.

In step 329, the output generator 180 generates a QNAME for data within the value field of the at least one encoded item. Note that a separate QNAME generation engine 119 that operates independently of the output generator 180 in one configuration may perform generation and management of QNAMES. As such, the processing steps 330 through 338 will be explained as being performed by the markup processing engine 110 as opposed to being strictly performed by the output generator 180. Generation of QNAMES may also include recognizing that a QNAME needed for a particular node already exists in a pool of QNAMES previously generated.

In step 330, to generate a QNAME, the markup processing engine 110 obtains QCODE values for a prefix portion, namespace portion, and suffix portion associated with the data in the value field of the at least one encoded item.

In step 331, the markup processing engine 110 generates a hash of the data within the value field of the at least one encoded item. The hash provides a numeric reference, referred to herein as a QCODE, that uniquely matches the data that is hashed.

In step 332, the markup processing engine 110 determines if a QCODE has been previously generated based on the hash for the data within the value field of the encoded item. The markup processing engine 110 (i.e., a QNAME generator) can maintain a table of presently assigned values to corresponding QCODES. In particular, a QNAME in one example embodiment is created from three components:

| |
|---|
| An 8 bit prefix QCODE |
| An 8 bit URI QCODE |
| An 16 bit LOCAL QCODE |

One example embodiment can provide a layered approach that uses multiple QNAME pools or groups of QNAMES. The pools can be organized by permanence in one example. This can be visualized in a concentric ring diagram in which the inner most pool or ring contains QNAMES that are used in long lived documents, and the outer pools or rings have QNAMES that are contained in progressively more transient documents. Examples of more permanent documents are XSLT stylesheets and compiled schema. Semi-permanent documents would include cached documents and perhaps cached XPATH expressions, etc. Transient documents would be everything else that is parsed or used during a given session.

A given QNAME is associated with the most prominent pool that it was ever looked up in; so if a QNAME is initially created while parsing a transient document, but later referenced in a cached document, it will move into the semi-permanent pool.

Internally, this can be implemented in one embodiment by using a single hash table mapping string values to a structure. The structure contains not only the QNAME component's index (QCODE), but also a numeric code indicated which pool the QNAME is a part of. As an example, a code of 0 would indicate the permanent pool, 1 the semi-permanent, and 2 the transient. Looking up a QCODE requires one to supply the pool code as well: if the QNAME component already exists but with a higher pool number, it is promoted by simply updating the pool number.

When the markup processing engine is in use, it is the arbiter of the pools and the software maintains a read-only copy. There can be instances when software requires the creation of a QNAME for a particular string of information. When the software requests a QNAME creation to the hardware of this invention, it will first do a lookup: if an entry exists and the pool corresponding to the entry is <=the pool provided on lookup, the entry containing the already created QNAME is returned.

Otherwise, a message is sent to the markup processing engine (i.e., to a QNAME generator device, not specifically shown in FIG. 1) containing the string and the pool code. The QNAME generator will take the message on a fast path and update its own tables, then send software 190 a response. The response is of the same form that is used to update SW tables when it creates new QNAMES during parsing.

The HW QNAME Engine 119 is responsible for taking element, attribute, and URI names and looking up the matching QCODEs. This engine "sniffs" the TLVs coming out of the HW parsing engine as they are being sent to the tree builder. It grabs any TLV that requires a QNAME lookup. This is done in order to allow QCODE processing to run in parallel with the HW parsing and treebuilding.

When an element name is parsed, the HW parsing engine calculates a hash code. It creates a TLV with the string and hash code which is grabbed by the QNAME processing engine. The TLV indicating it is an element name is passed to the tree builder, but the tree builder in one configuration does not receive the string or hash code. The QNAME engine 119 does a hash code lookup and a string compare to get the number associated with the name. The hash code will be looked up in one of three tables depending on whether the string is a prefix, suffix or URI. If there is a matching string in the hash table, the QCODE associated with that name is sent to the tree builder. If there is no QCODE assigned, a new one must be created. To do this, a new entry is added in the appropriate hash table, and a special message sent to software 190. This message will use the TLV format and will give software the new QCODE value, the hash code and qpool it is associated with and the string. With this data, software can keep its own QCODE tables in main memory in whatever format is the most efficient for its processing. It is not required to keep it in the same format as the hardware QCODE tables. If a QCODE does exist, but the pool id of the current number indicates a pool lower than the pool used for this document, the QCODE is promoted to higher pool and a message is sent back to software. The format of the messages is discussed in the TLV section of the document.

The hardware thus keeps track of three QCODE tables—prefix, URI, and local. The three hashtables are kept in an external RAM. The index into the hashtable is derived from the lower bits of the hashcode calculated by the character processor 120. Each entry in the hash table is 32 bytes long. One example of the hashtable format is as follows:

| Bit 71 | | | | Bit 0 |
|---|---|---|---|---|
| Pointer (16) | Poolid (8) | Qcode (16) | Length (15 bits) | Hashcode (17) |
| Characters 1–9 | | | | |
| Characters 10–18 | | | | |
| Characters 19–27 | | | | |

A pointer in the table entry is used to point to either the next QCODE entry (which collides) with this entry in the hashcode table or it points to a space in memory which contains the rest of the characters for this string. The hardware uses the length field to tell the difference. If the length field=0 and the pointer field is not equal to zero that indicates that this entry has no data, but there is another valid entry mapped to this hashcode. The only time this would occur is if there had been a collision in the hashtable and the QCODE for the first number was retired by software. The following shows an example of a QNAME continuation:

| Bit 71 | | Bit 0 |
|---|---|---|
| Pointer (15) | | rfu |
| Characters 28–36 | | |
| Characters 37–45 | | |
| Characters 46–54 | | |

When a name is longer than 27 characters, characters 28+ are stored in the structure above. These structures are chained together until the entire name is in memory. Prefix and suffix names will typically fit into the hashtable entry. URIs will most likely require the hashtable entry in addition to one or two additional buffers.

At a macro level, the QCODE memory is organized as:

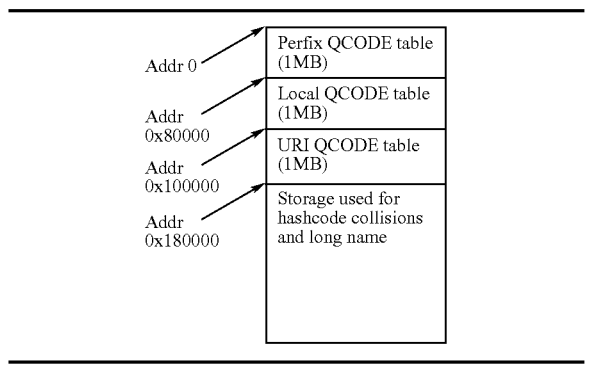

The hardware provides the ability to:
   Allow software to do bulk initialization of the hashtables
   Delete all entries at a given QPOOL level.
   Promote QCODEs from one QPOOL to another based on the pool id given when a session is opened.

Hardware to maintain 3 free pools of QCODEs—one for prefixes, one for URIs, and one for local parts.

With the above structure, QNAMEs 9 characters or less, the HW can do QNAME lookups at >180 MB/s (assuming 80 MHz operation with 4 cycles to do the compares) for a given Character processor.

If the HW tree builder needs a QNAME to finish creating a node and the QNAME engine has not returned it, the HW tree builder will wait until the QNAME engine has completed its processing before moving on to a new TLV.

One of the key difference in the system is that the assignment of QCODEs occurs on the PCI card and is not controlled by software. This means that whenever software wants to create a QNAME, it sends the request to hardware. Software indicate it needs a QCODE by writing a pointer to the string in a "mailbox" register in an interface in hardware. SW will then poll a return mailbox register to get the resulting QCODE.

Thus in one embodiment, the markup processing device receives the markup language representation containing encoded items representative of markup language constructs and identifies data within the markup language representation that represents a respective markup language construct. In response, the markup processing device generates a numeric representation for the data, such as a QNAME. As explained above, the numeric representation provides a unique searchable value that corresponds to the data and that may be searched faster than searching for the data itself. The markup processing device then establishes a new node in the linked data structure of nodes that represent respective markup language constructs within the markup language representation, the new node containing the numeric representation for the data. The system of the invention can maintain pools of QNAMES for previously identified data within already encountered markup language constructs and can receive data associated with a markup language construct for which a QNAME is to be generated. In response, the system determines that the data for which the QNAME is to be generated already has an existing QNAME in a QNAME pool, and in response, provides the QNAME from the QNAME pool for that data. In this manner, a QNAME engine and tree builder work in conjunction to create nodes that are quickly searchable (for example by software 190).

Returning attention to the flow chart of processing steps in FIG. 7, in step 333, if a QCODE has been previously generated, the markup processing engine 110 obtains the previously generated QCODE for the data within the value field of the encoded item, and if a QCODE has not been previously generated, then in step 334, the markup processing engine 110 generates a QCODE on the data within the value field of the at least one encoded item. In this manner, QCODEs are reused for equivalent data values.

In step 335, the markup processing engine 110 maintains the generated QCODE in a list of QCODEs (e.g., the table of values and corresponding QCODES).

In step 336, the markup processing engine 110 obtains a namespace QCODE for the namespace portion associated with the value field of the encoded item; and In step 337, the markup processing engine 110 obtains a QCODE for at least one of prefix or suffix data within the value field of the encoded item. This may be a QCODE from a prefix or suffix defined by another TLV in the sequence of encoded items.

In step 338, the markup processing engine 110 combines the QCODE values for a prefix portion, namespace portion, and suffix portion to produce the QNAME for data within the value field of the at least one encoded item. In this manner, a QNAME is a tuple of prefix, namespace and suffix QCODEs that uniquely identify the value referenced by the TLV for which the QNAME is generated.

Figure 8:
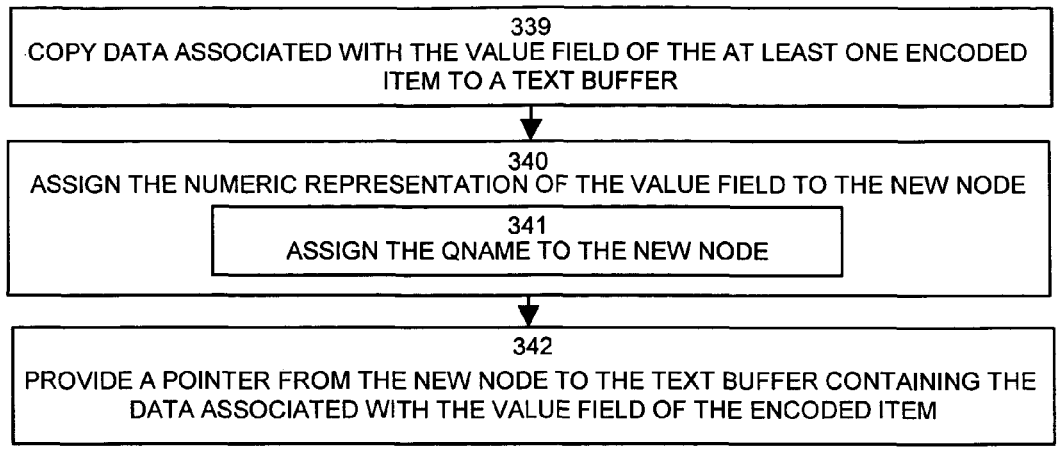
FIG. 8 is a flow chart of processing steps that show details of processing for QNAME assignment to nodes in a tree by an output generator operating in accordance with one example embodiment of the invention.

FIG. 8 is a flow chart that shows QNAME assignment processing for the new node 197 being created in the buffer of nodes 170. More specifically, this figure shows the completion of adding a new QCODE to an internal lookup table which may or may not be associated with new node creation. There are cases were a QCODE is created that isn't initiated by building a tree. When a new QCODE is created for a new tree node, the new node gets the QNAME (made up of the new QCODES) but it does not, in one configuration, get a pointer to the place were QCODE values are stored. Instead, QCODE is used as a reference into another table if the application 190 ever wants to get back the string it represents.

In step 339, the output generator 180 copies data associated with the value field of the at least one encoded item to a text buffer. In this manner, the data portion of the TLV is not saved in the node 197, but is placed in a buffer in memory.

In step 340, the output generator 180 assigns the numeric representation of the value field to the new node.

Specifically, in step 341, the output generator 180 assigns the QNAME to the new node 197 in the QNAME field.

Then, in step 342, the output generator 180 provides a pointer from the new node to the text buffer containing the data associated with the value field of the encoded item. In this manner, the data portion of the TLV is referenced with a pointer to the buffer in memory that stores this data (from step 339). As noted above, this in one example of QCODE and QNAME processing and is not limiting to embodiments of the invention.

Using the aforementioned processing, embodiments of the invention can create a tree 185 that is small in size since some of the data is not required to be stored in the tree. As an example, a large data value can be referenced in the tree via a QNAME or address pointer to a location in memory, thus the tree 185 itself is small and does not need to contain the actual data. Quick indexing and searching can be performed by the application 190 using QNAME searching as opposed to slower string matching on actual data.

Figure 9:
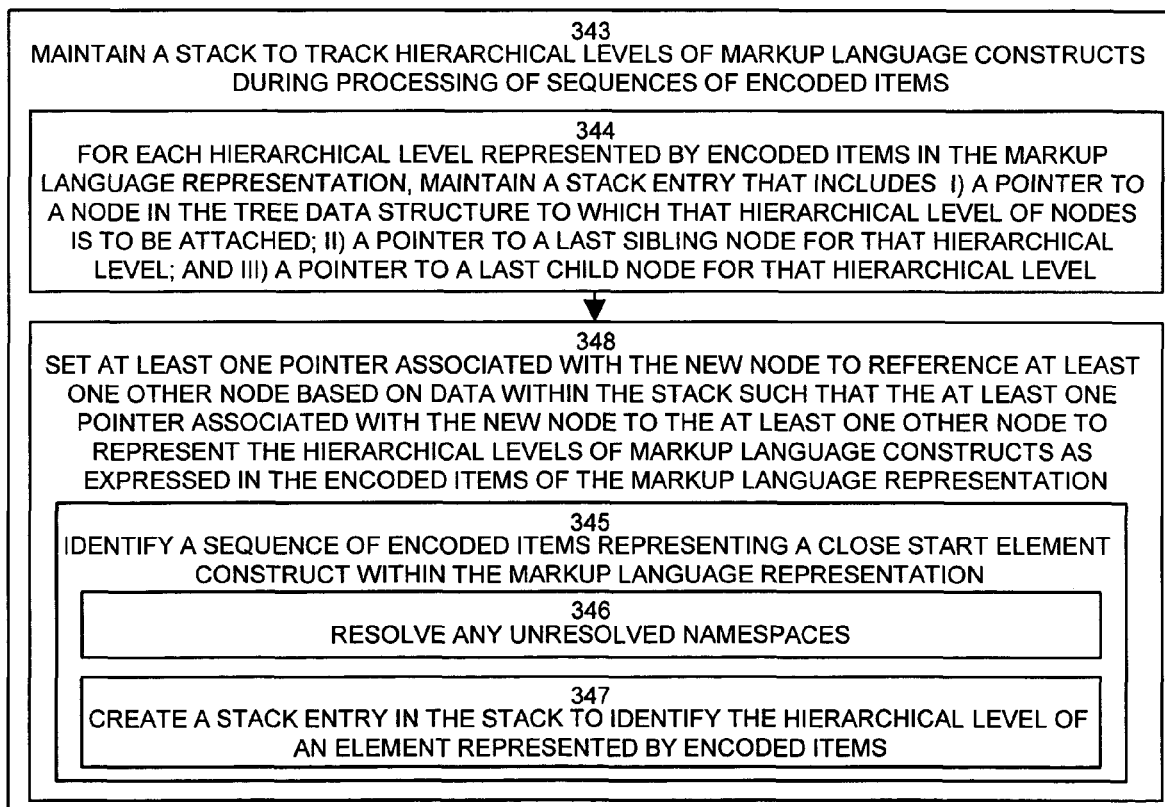
FIG. 9 is a flow chart of processing steps that show details of stack processing used to track node pointer and hierarchical levels of nodes in the tree by an output generator in accordance with one example embodiment of the invention.

FIG. 9 is a flow chart that shows how pointers are linked between new nodes 197 as the nodes 197 are created in the buffer of nodes 170. This processing was presented briefly in the buffer management discussion above.

In step 343, the output generator 180 maintains a stack 196 (FIG. 3) to track hierarchical levels of markup language constructs during processing of sequences of encoded items 160 of the markup language representation.

In step 344, for each hierarchical level represented by encoded items in the markup language representation, the output generator 180 maintains a stack entry that includes i) a pointer to a node in the tree data structure to which that hierarchical level of nodes is to be attached; ii) a pointer to a last sibling node for that hierarchical level; and iii) a pointer to a last child node for that hierarchical level.

In step 345, the output generator 180 sets at least one pointer associated with the new node 197 to reference at least one other node 197 based on data within the stack such that the at least one pointer associated with the new node to the at least one other node to represent the hierarchical levels of markup language constructs as expressed in the encoded items of the markup language representation. In this manner, the stack can track proper and current parent and child and sibling node identities as each level in the hierarchy is entered and exited during TLV processing.

In particular, as one example, in step 346, the output generator 180 identifies a sequence of encoded items representing a "close start element" construct within the markup language representation. This indicates the beginning of a hierarchy level.

In step 347, in response, the output generator 180 resolves any unresolved namespaces.

In step 348, the output generator 180 creates a stack entry in the stack to identify the hierarchical level of an element represented by encoded items in the markup language representation. This will identify the last node created in the buffer for that level within the stack 196.

Figure 10:
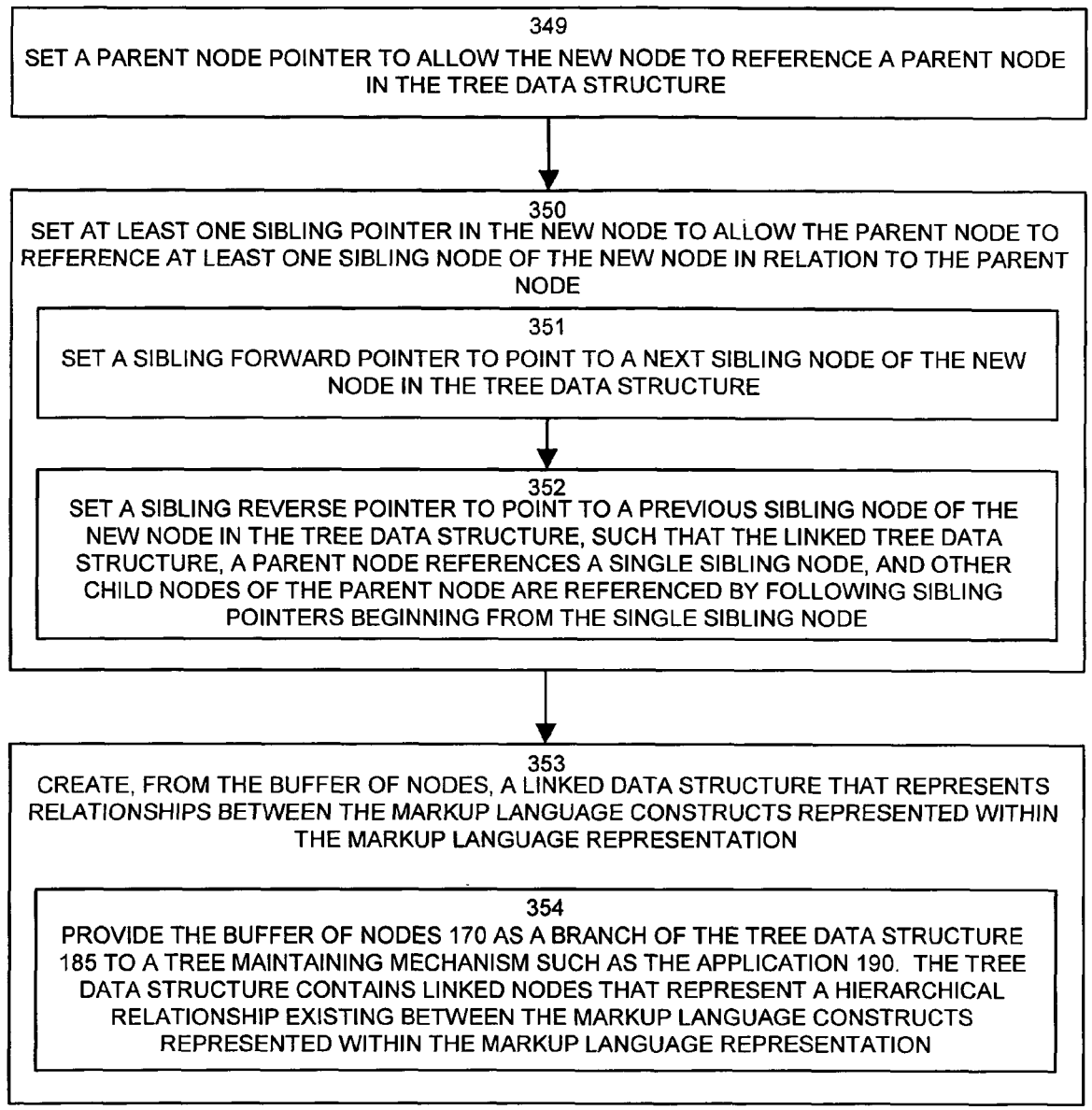
FIG. 10 is a flow chart of processing steps that show details of pointer processing and tree creation by an output generator in accordance with one example embodiment of the invention.

FIG. 10 is a flow chart of processing performed by the output generator 180 to complete node pointer assignment and processing and to pass the buffer of nodes 170 as a branch to the software 190 for tree creation.

In step 349, the output generator 180 sets a parent node pointer in the new node 197 to allow the new node to reference a parent node in the tree data structure 185. The stack information can be used to obtain this pointer.

In step 350, the output generator 180 sets at least one sibling pointer in the new node 197 to allow the parent node to reference at least one sibling node of the new node in relation to the parent node. Again, the stack information can be used to obtain sibling pointers.

In particular, in step 351, the output generator 180 sets a sibling forward pointer to point to a next sibling node of the new node in the tree data structure 185.

In step 352, the output generator 180 sets a sibling reverse pointer to point to a previous sibling node of the new node in the tree data structure 185. In this configuration, in the tree data structure 185, a parent node such as 197-1 references a single sibling node 197-2 and other child nodes 197-3 through 197-5 of the parent node 197-1 are referenced by following sibling pointers beginning from the single sibling (i.e., direct linked child) node 197-2.

In step 353, the output generator 180 creates (or enables creation of), from the buffer of nodes, a linked data structure (e.g., a tree) that represents relationships between the markup language constructs represented within the markup language representation.

In step 354, to do so in one embodiment as was briefly explained above in the buffer management discussion, the output generator 180 provides the buffer of nodes 170 as a branch of the tree data structure 185 to a tree maintaining mechanism such as the application 190. The tree data structure contains linked nodes that represent a hierarchical relationship existing between the markup language constructs represented within the markup language representation.

In one configuration, trees that the hardware 110 builds typically have at least two buffers associated with them—one for text data or value and at least one for the tree buffer 170 itself. If the tree or the text data does not fit in one buffer 170, the tree builder 135 requests and allocated additional buffers as explained above. When the markup processing engine 110 is ready to hand back a piece of a tree as a buffer 170, it sends a message 199 to the software 190 such as:

Text buffer:
    Session id,
    Virtual buffer address
    Buffer length
Tree buffer
    Session id
    Virtual Buffer address
    Address indicating where to attach this branch into the main tree.
        If this address is 0 that means that this is the root of the tree.

One feature that allows the tree builder 135 to build trees 185 is having the ability to pass back branches in buffers 170 and not being required to pass back an entire tree 185. By allowing this, the tree builder 135 significantly reduces the amount of memory the processing requires. However, allowing passing back of tree branches as buffer 170 means the software 190 is required to help in hooking these buffer branches 170 into the main tree 185. Fortunately, the tree builder 135 can remember what former node to hook the current buffer 170 branch too.

As an example, if the following document 105 is processed:

<root><child1><gc1/><gc2>gc2_text_node</gc2><gc3/></child1></root>

If the document 105 came in two parts from the tree builder 135 as separate buffers 170-1 and 170-2:

---

Part #1 170-1:
    <root><child1><gc1/>
Part #2 170-2:
    <gc2>gc2_text_node</gc2><gc3/></child1></root>

---

The tree 185 for this document would be returned to software 190 in two pieces:

Part #1: Virtual Address = 0x56700800 root (address = 0x56700800)
    |
    child1 (address = 0x56700828)
    |
    gc1 (address = 0x56700850)

-continued
Part #2: Virtual Address = 0x07348000

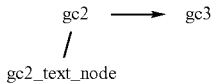

The parent pointer for "gc2" would point to "child1" (0x56700828) when the tree is returned. In addition, the sibling reverse pointer for "gc2" needs to point to "gc1" (0x56700850). The only information that the application 190 needs to process when it receives the partial tree branch 170 is to set "gc1" sibling forward pointer to "gc2" (0x07348000). This "connection" information is passed to software in the message 199 sent back from hardware 110. The message 199 contains the address of this buffer 170 and the address of the "gc1" forward sibling pointer. As noted above, the application 190 can be software or subsequent hardware processing.

The final tree 185 will look like:

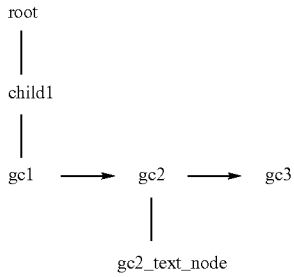

In one configuration, the markup processing engine 110 is capable of building the second part of the tree in the same buffer as the first part so that buffers are used efficiently.

As another example #2, if the document 105 came from the tree builder 135 in two buffers 170-1 and 170-2 as follows:

```
Part #1 170-1:
    <root><child1><gc1/><gc2>
Part #2 170-2:
    gc2_text_node</gc2><gc3/></child1></root>
```

The tree 185 for this document is returned in three pieces:

Part #1: Virtual Address = 0x56700800 root (address = 0x56700800)
|
child1 (address = 0x56700828)
|
gc1 ⟶ gc2

Part #2: Virtual Address = 0x07348000 gc2_text_node
Part #3: Virtual Address = 0x07348020

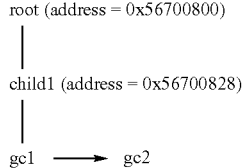

The second part of the document is passed back to software 190 as two tree branches—the first is the branch that contains the children of "gc2". The second is the branch that returns the siblings of "gc2". These are not returned in the same tree branch because they need to hook into different locations of the primary tree 185. For instance, the parent pointer for "gc2_text_node" points to "gc2" when the tree is returned. Software 190 sets the child pointer for "gc2" to point to "gc2_text_node" based on the information sent back in the message from hardware. The next tree that comes back is "gc3", its parent pointer points to "child1" and its sibling reverse pointer points to "gc2". Software 190 can make the sibling connection from gc2→gc3 based on the message 199 passed back from the hardware 110. Note that in this case the hardware builds branch #2 & branch #3 in the same buffer.

If the tree builder 135 is processing TLVs and a session switch 125 (FIG. 1) occurs before all of the data for a text node 197 has come in, then the tree builder 135 writes the partial text to system memory, but the tree builder 135 does not inform the application 190 that the buffer 170 is there. Instead, the tree builder 135 can maintain session state 170 concerning where the text is and continues writing to that buffer 170 when new data for that session 105 occurs again. The text node 197 is entered in the tree buffer 170 because the tree builder 135 has all of the information to create the node 197.

Similarly if the tree builder 135 is in the middle of collecting an element or attribute name, and the document 105 is switched before the name is completed, the tree builder 135 remembers this name in the session state 170 and performs a QNAME lookup when the document session 105 continues. In this case, the characters are stored in a local RAM (e.g., a DRAM) until the name is completed. The tree builder 135 may create the new tree node 197, but it does not tell software 190 that the node exists until the entire element or attribute has been completed. Likewise, if a session switch 125 occurs in the middle of element markup, the new node 197 will be created, but software 190 is not told about the node 197 until the tree builder 135 sees the end of the markup and has resolved any namespaces.

Below is an example of processing perform for each different TLV type that is encountered in the intermediate representation 160 by the tree builder configured according to one embodiment of the invention:

Start-element prefix:
    Create an element node & get QCODE for prefix
Start-element suffix:
    Create element node if one doesn't exist, get QCODE for suffix, combine it with prefix QCODE
Close start element:
    Resolve namespaces if necessary
Empty element:
    Resolve namespaces if necessary
Attribute prefix:
    Create an attribute node & get QCODE for prefix
Attribute suffix:
    Create an attribute node if one doesn't exist, get QCODE for suffix, combine it with prefix QCODE
Namespace prefix:
    Get QCODE prefix & add new entry to namespace table.
Namespace URI:
    Get QCODE and update entry in namespace table. Create an entry in the buffer where the tree is being built
XML Version, encoding, standalone:
    Ignore
Comment:
    Create a Comment node
Text:
    Create a text node Whitespace:
  Check to see if we should strip whitespace—if not, create a text node & mark it as whitespace
PI Target:
  Create a PI node & get QNAME for the name
PI Data:
  Point PI "value" pointer at Data in text buffer.
Attribute Value
  Point Attribute "value" pointer at data in text buffer.
DTD:
  If capable, process the DTD, otherwise, return TLVs to the application.
Entity:
  Error—well-known entities are converted by the CP, if other entities exist, there should have been a DTD in the document.
End Element prefix checked:
  Ignore
End element suffix checked:
  Pop level off of the "element stack"
End element prefix unchecked:
  Get QCODE for prefix & check it against the prefix QNAME in the element stack
End element suffix unchecked:
  Get QCODE for the suffix, check it against the suffix QNAME in the element stack, and pop a level off of the element stack.

Note that the create node operation implies assigning the appropriate parent, child and sibling pointers. In addition to the aforementioned processing operations, the tree builder 135 provides a mechanism for handling the case where the text in a document exceeds the size of the buffers 170 which have been handed to the FPGA. In this case, the hardware write the text to data memory using as many buffers 170 as required and create a TLV buffer with TLVs pointing to each of the buffers 170. The TLVs for all of the buffers except the last one will have a fragment bit set so software 190 knows there are multiple buffers 170 which make up the node 197. When software 190 reaches the TLV with no fragment bit set, the software can allocate the appropriate space in the arena, copy all of the data to that space and free each text buffer 170. The last TLV indicates where the address of this new buffer should be hooked into the tree (node value pointer). This technique can be used for any "value" type data which exceeds a buffer size (attribute value, PI Data, etc). In addition, this technique can be used if partial text had been written to a text buffer, the session switched, and when the tree builder 135 resumed work on the first document 105, the rest of the text did not fit in the current text buffer.

Those skilled in the art will understand that there can be many variations made to the embodiments explained above while still achieving the same objective of those embodiments and the invention in general. As an example, it is to understood that embodiments of the invention are not limited to processing XML markup language streams 105, but are applicable to converting any type of markup language to encoded item format. In addition, preferred embodiments of the invention are implemented in hardware as a set of gates programmed into a microcontroller such as a Field Programmable Gate Array (FPGA) or equivalent device. In such an embodiment, a developer of a system including an embodiment of the invention embeds the method for processing markup language data as a series of logic instructions within a dedicated programmable microcontroller in hardware (as opposed to providing such instructions as software code that executes on a general purposes central processing unit). The programmable microcontroller may be a FPGA microchip that includes an input interface (e.g., a data bus or input pins into the chip) for receiving the character stream of markup language data and an output interface (e.g., an output bus, or set of pins, that may be the same as the input interface pins) for producing the tree data 185 or buffers of branches 170. The microcontroller can thus embody the character processor 120 (or the character processor 120 can be a portion of the logic embedded within the microcontroller) and the tree builder 135, or just the tree builder 135, and can be included in the computerized device 110, that may be a dedicated markup language processing device. In operation, the programmable microcontroller operates in hardware to process the markup language data representation such that all processing of the markup language data is done in hardware (e.g., in a ASIC, FPGA or any circuitry or hardware component) and such that software processing of the markup language data is not required by a general-purpose central processing unit (e.g., a CPU in a computer that loads and executes software programs).

Additionally, the receiving application 190 in one embodiment may instead, in alternative embodiments, be another hardware processor or a node or device (e.g., a server, router, network switch, gateway) on a computer network that receives XML tree structures, thereby enabling the efficient transfer of already parsed XML trees between systems in a network.

Thus, a hardware-based embodiment provides a tree builder device. Accordingly, embodiments of the invention are not intended to be limiting to the aforementioned discussion, but rather, equivalents and variations now apparent to those skilled in the art from reading this disclosure of the aforementioned processing steps are intended to be included as embodiments of the invention as well.

What is claimed is:

1. A method for converting a markup language representation to a data structure format containing representations of constructs in the markup language representation, the method comprising:
  receiving a markup language representation containing encoded items representative of markup language constructs, by receiving a stream of encoded items containing type, length, value representations of extensible markup language constructs within the markup language representation;
  identifying a sequence of encoded items within an intermediate representation that represents a respective markup language construct, wherein identifying a sequence of encoded items within the intermediate representation that represents a respective markup language construct comprises:
    obtaining at least one encoded item from the received markup language representation;
    providing a pre-allocated buffer of nodes including at least two of:
      i) a new attribute node within the buffer of nodes;
      ii) a new element node within the buffer of nodes;
      iii) a new processing instruction node within the buffer of nodes; and
      iv) a new content node within the buffer of nodes;
    establishing, within a buffer of nodes, a new node for the sequence of encoded items that represents a respective markup language construct; by:
      allocating an appropriate type of node from the pre-allocated buffer of nodes, based on the type of at least one encoded item in the sequence of encoded items, as the new node within the buffer of nodes;

setting data fields within the new node with corresponding data associated with the at least one encoded item, the data fields including a node type data field and a set of related node data fields associating the new node to at least one other node previously allocated in the buffer;

creating, from the buffer of nodes, a linked data structure that represents relationships between the markup language constructs represented within the markup language representation, wherein creating, from the buffer of nodes, a linked data structure comprises:

creating a tree data structure from the buffer of nodes, the tree data structure containing linked nodes that represent a hierarchical relationship existing between the markup language constructs represented within the markup language representation; and generating a numeric representation of a value field of the at least one encoded item including generating a QNAME for data within the value field of the at least one encoded item by combining QCODE values for a prefix portion, namespace portion, and suffix portion associated with the data in the value field of the at least one encoded item; wherein a QCODE is a hash of the data within the value field of the at least one encoded item and the hash provides a numeric reference that uniquely matches the data that is hashed.

2. The method of claim 1 wherein setting data fields within the new node with corresponding data associated with the at least one encoded item comprises:

setting a parent node pointer to allow the new node to reference a parent node in the tree data structure; and setting at least one sibling pointer in the new node to allow the parent node to reference at least one sibling node of the new node in relation to the parent node, such that, in the tree data structure, a parent node references a single sibling node and other child nodes of the parent node are referenced by following sibling pointers beginning from the single sibling node.

3. The method of claim 2 wherein setting at least one sibling pointer in the new node comprises:

setting a sibling forward pointer to point to a next sibling node of the new node in the tree data structure; and setting a sibling reverse pointer to point to a previous sibling node of the new node in the tree data structure.

4. The method of claim 2 comprising:

maintaining a stack to track hierarchical levels of markup language constructs during processing of sequences of encoded items of the markup language representation and track parent and child levels for nodes in the hierarchy expressed in the type, length, value (TLV) sequences of elements, attributes, processing instruction (PI) statements, text and comment constructs; and wherein setting data fields within the new node with corresponding data associated with the at least one encoded item comprises:

setting at least one pointer associated with the new node to reference at least one other node based on data within the stack such that the at least one pointer associated with the new node to the at least one other node to represent the hierarchical levels of markup language constructs as expressed in the encoded items of the markup language representation.

5. The method of claim 4 wherein maintaining a stack to track hierarchical levels of markup language constructs comprises:

for each hierarchical level represented by encoded items in the markup language representation, maintaining a stack entry that includes:

i) a pointer to a node in the tree data structure to which that hierarchical level of nodes is to be attached;

ii) a pointer to a last sibling node for that hierarchical level; and iii) a pointer to a last child node for that hierarchical level.

6. The method of claim 5 wherein allocating an appropriate type of node based on the type of the at least one encoded item as the new node within the buffer of nodes comprises:

identifying a sequence of encoded items representing a close start element construct within the markup language representation and in response, performing the operations of:

i) resolving any unresolved namespaces; and ii) creating a stack entry in the stack to identify the hierarchical level of an element represented by encoded items in the markup language representation.

7. The method of claim 1 comprising:

determining if a buffer of nodes is available for allocation of the new node, and if not, creating a new buffer of nodes as the buffer of nodes in which new nodes can be allocated;

matching the type of the at least one encoded item to identify a markup language construct; and determining if sufficient space is available within the buffer of nodes for creation of a new node, and if sufficient space is available within the buffer of nodes for creation of a new node, allocating an appropriate type of node as the new node within the buffer of nodes based on the matched type of the at least one encoded item, and if sufficient space is not available within the buffer of nodes for creation of a new node, providing the buffer of nodes as a branch of the tree data structure to a tree maintaining mechanism and creating a new buffer of nodes as the buffer of nodes in which new nodes can be allocated.

8. The method of claim 7 wherein providing the buffer of nodes as a branch of a tree to a tree maintaining mechanism comprises:

providing, to the tree maintaining mechanism, a pointer to a start node of the buffer of nodes and a pointer to an attachment node in the tree data structure of nodes to which to attach the buffer of nodes as the branch of the tree.

9. The method of claim 1 comprising:

identifying that the type of the at least one encoded item requires allocation of a node including an numeric representation of the value field of the encoded item;

copying data associated with the value field of the at least one encoded item to a text buffer;

assigning the numeric representation of the value field to the new node; and providing a pointer from the new node to the text buffer containing the data associated with the value field of the encoded item.

10. The method of claim 9 wherein assigning the numeric representation of the value field to the new node comprises:

assigning the QNAME to the new node.

11. The method of claim 10 wherein generating a QNAME for data within the value field of the encoded item comprises:

obtaining QCODE values for a prefix portion, namespace portion, and suffix portion associated with the data in the value field of the at least one encoded item.

12. The method of claim 11 wherein obtaining QCODE values for the prefix portion, namespace portion, and suffix portion associated with the data in the value field of the at least one encoded item comprises:
  determining if a QCODE has been previously generated based on the hash for the data within the value field of the encoded item;
  if a QCODE has been previously generated, obtaining the previously generated QCODE for the data within the value field of the encoded item;
  if a QCODE has not been previously generated:
    i) generating a QCODE on the data within the value field of the at least one encoded item; and
    ii) maintaining the generated QCODE in a list of QCODEs;
  obtaining a namespace QCODE for the namespace portion associated with the value field of the encoded item; and
  obtaining a QCODE for at least one of prefix or suffix data within the value field of the encoded item.

13. The method of claim 11 further comprising storing the QNAMES within corresponding nodes in the linked data structure.

14. The method of claim 1 wherein allocating an appropriate type of node based on the type of the at least one encoded item as the new node within the buffer of nodes comprises:
  identifying a sequence of encoded items representing an element within the markup language representation and in response, allocating an element node within the buffer of nodes;
  and wherein setting data fields within the new node with corresponding data associated with the at least one encoded item comprises:
  setting a value pointer of the element node to point to a memory location containing a value of text of a markup language construct represented by the value field of the at least one encoded item; and
  setting a QNAME field of the element node to contain a QNAME generated based on data in the value field of the at least one encoded item.

15. The method of claim 1 wherein allocating an appropriate type of node based on the type of the at least one encoded item as the new node within the buffer of nodes comprises:
  identifying a sequence of encoded items representing an attribute element within the markup language representation and in response, allocating an attribute node within the buffer of nodes;
  and wherein setting data fields within the new node with corresponding data associated with the at least one encoded item comprises:
  setting a value pointer of the attribute node to point to a memory location containing a value of an attribute of a markup language construct represented by the value field of the at least one encoded item;
  setting a QNAME field of the attribute node to contain a QNAME generated based on data in the value field of the at least one encoded item; and
  setting a related node data field to reference at least one of:
  i) a sibling node existing in the buffer as a child of a parent node that is an element node; and
  ii) a parent node that is an element node.

16. The method of claim 1 wherein allocating an appropriate type of node based on the type of the at least one encoded item as the new node within the buffer of nodes comprises:
  identifying a sequence of encoded items representing an text element within the markup language representation and in response, allocating a text node within the buffer of nodes;
  and wherein setting data fields within the new node with corresponding data associated with the at least one encoded item comprises:
  setting a value pointer of the text node to point to a memory location containing a value of text of a markup language construct represented by the value field of the at least one encoded item.

17. The method of claim 1 wherein allocating an appropriate type of node based on the type of the at least one encoded item as the new node within the buffer of nodes comprises:
  identifying a sequence of encoded items representing a processing instruction construct within the markup language representation and in response, allocating a processing instruction node within the buffer of nodes;
  and wherein setting data fields within the new node with corresponding data associated with the at least one encoded item comprises:
  setting a value pointer of the element node to point to a memory location containing a value of text of a markup language construct represented by the value field of the at least one encoded item; and
  setting a QNAME field of the element node to contain a QNAME generated based on data in the value field of the at least one encoded item.

18. The method of claim 1 wherein the processing steps are performed as embedded instructions in a hardware device.

19. The method of claim 1 wherein receiving comprises:
  receiving a plurality of streams of encoded items containing type, length, value representations of extensible markup language constructs, wherein each received stream corresponds to a different document that includes the extensible markup language constructs represented in that stream;
and wherein the method includes:
  assigning an identity to each received stream;
  executing a conversion on a particular received stream, by performing the steps of identifying, establishing, and creating on the particular received stream, wherein the particular received stream is identified by its identity; and
  indicating that a different stream is to be converted by providing the identity of that stream.

20. The method of claim 1 further comprising
  building new tree branches by putting a parent pointer into a new tree branch of the newly allocated buffer;
  hooking tree branches together; and
  using a partial tree to process an XML stream before the tree is completely built.

21. The method of claim 1 further comprising passing both a virtual and a physical address of each buffer to a tree building hardware accelerator.

22. The method of claim 21 wherein the buffer virtual address is used to connect parent and child node pointers and the physical address is used for transferring data.

23. A processing device for converting a markup language representation to a data structure format containing representations of constructs in the markup language representation, the processing device comprising:
  a processor;
  an input interface for receiving a markup language representation containing encoded items representative of markup language constructs, by receiving a stream of encoded items containing type, length, value representations of extensible markup language constructs within the markup language representation;
  logic processing coupled to the input interface and configured to identify a sequence of encoded items within an intermediate representation that represents a respective markup language construct and configured to establish, within a buffer of nodes, a new node for the sequence of encoded items that represents a respective markup language construct, wherein when the logic processing performs the operation of identifying a sequence of encoded items within the intermediate representation that represents a respective markup language construct, the logic processing performs the operations of:
    obtaining at least one encoded item from the receive markup language representation; and
    matching the type of the at least one encoded item to identify a markup language construct that will require creation of at least one of:
        i) a new attribute node within the buffer of nodes;
        ii) a new element node within the buffer of nodes;
        iii) a new processing instruction node within the buffer of nodes; and
        iv) a new content node within the buffer of nodes; and
the logic processing creating, via an output interface coupled to the logic processing, from the buffer of nodes, a linked data structure that represents relationships between the markup language constructs represented within the markup language representation, wherein when the logic processing performs the operation of creating, from the buffer of nodes, a linked data structure the logic processing performs the operation of:
    creating a tree data structure from the buffer of nodes, the tree data structure containing linked nodes that represent a hierarchical relationship existing between the markup language constructs represented within the markup language representation;
wherein when the logic processing performs the operation of establishing, within a buffer of nodes, a new node for the sequence of encoded items that represents a respective markup language construct, the logic processing performs the operations of:
    allocating an appropriate type of node, based on the type of at least one encoded item in the sequence of encoded items, as the new node within the buffer of nodes;
    setting data fields within the new node with corresponding data associated with the at least one encoded item, the data fields including a node type data field and a set of related node data fields associating the new node to at least one other node previously allocated in the buffer;
    generating a numeric representation of a value field of the at least one encoded item including generating a QNAME for data within the value field of the at least one encoded item by combining QCODE values for a prefix portion, namespace portion, and suffix portion associated with the data in the value field of the at least one encoded item; wherein a QCODE is a hash of the data within the value field of the at least one encoded item and the hash provides a numeric reference that uniquely matches the data that is hashed.

24. The processing device of claim 23 wherein when the logic processing performs the operation of setting data fields within the new node with corresponding data associated with the at least one encoded item, the logic processing performs the operations of:
    setting a parent node pointer to allow the new node to reference a parent node in the tree data structure; and
    setting at least one sibling pointer in the new node to allow the parent node to reference at least one sibling node of the new node in relation to the parent node, such that, in the tree data structure, a parent node references a single sibling node and other child nodes of the parent node are referenced by following sibling pointers beginning from the single sibling node.

25. The processing device of claim 24 wherein when the logic processing performs the operation of setting at least one sibling pointer in the new node, the logic processing performs the operations of:
    setting a sibling forward pointer to point to a next sibling node of the new node in the tree data structure; and
    setting a sibling reverse pointer to point to a previous sibling node of the new node in the tree data structure.

26. The processing device of claim 24 wherein the logic processing performs the operations of:
    maintaining a stack to track hierarchical levels of markup language constructs during processing of sequences of encoded items of the markup language representation; and
    wherein when the logic processing performs the operation of setting data fields within the new node with corresponding data associated with the at least one encoded item, the logic processing performs the operation of:
    setting at least one pointer associated with the new node to reference at least one other node based on data within the stack such that the at least one pointer associated with the new node to the at least one other node to represent the hierarchical levels of markup language constructs as expressed in the encoded items of the markup language representation.

27. The processing device of claim 26 wherein when the logic processing performs the operation of maintaining a stack to track hierarchical levels of markup language constructs, the logic processing performs the operation of:
    for each hierarchical level represented by encoded items in the markup language representation, maintaining a stack entry that includes:
        i) a pointer to a node in the tree data structure to which that hierarchical level of nodes is to be attached;
        ii) a pointer to a last sibling node for that hierarchical level; and
        iii) a pointer to a last child node for that hierarchical level.

28. The processing device of claim 27 wherein when the logic processing performs the operation of allocating an appropriate type of node based on the type of the at least one encoded item as the new node within the buffer of nodes, the logic processing performs the operation of:
    identifying a sequence of encoded items representing a close start element construct within the markup language representation and in response, performing the operations of:
        i) resolving any unresolved namespaces; and
        ii) creating a stack entry in the stack to identify the hierarchical level of an element represented by encoded items in the markup language representation.

29. The processing device of claim 23 wherein the logic processing performs the operations of:
    determining if a buffer of nodes is available for allocation of the new node, and if not, creating a new buffer of nodes as the buffer of nodes in which new nodes can be allocated;
    matching the type of the at least one encoded item to identify a markup language construct and
    determining if sufficient space is available within the buffer of nodes for creation of a new node, and if sufficient space is available within the buffer of nodes for creation of a new node, allocating an appropriate type of node as the new node within the buffer of nodes based on the matched type of the at least one encoded item, and if sufficient space is not available within the buffer of nodes for creation of a new node, providing the buffer of nodes as a branch of the tree data structure to a tree maintaining mechanism and creating a new buffer of nodes as the buffer of nodes in which new nodes can be allocated.

30. The processing device of claim 29 wherein when the logic processing performs the operation of providing the buffer of nodes as a branch of a tree to a tree maintaining mechanism, the logic processing performs the operation of:
providing, to the tree maintaining mechanism, a pointer to a start node of the buffer of nodes and a pointer to an attachment node in the tree data structure of nodes to which to attach the buffer of nodes as the branch of the tree.

31. The processing device of claim 23 wherein the logic processing performs the operations of:
identifying that that the type of the at least one encoded item requires allocation of a node including an numeric representation of the value field of the encoded item;
copying data associated with the value field of the at least one encoded item to a text buffer;
assigning the numeric representation of the value field to the new node; and
providing a pointer from the new node to the text buffer containing the data associated with the value field of the encoded item.

32. The processing device of claim 31,
wherein when the logic processing performs the operation of assigning the numeric representation of the value field to the new node, the logic processing performs the operation of:
assigning the QNAME to the new node.

33. The processing device of claim 32 wherein when the logic processing performs the operation of generating a QNAME for data within the value field of the encoded item, the logic processing performs the operations of:
obtaining QCODE values for a prefix portion, namespace portion, and suffix portion associated with the data in the value field of the at least one encoded item.

34. The processing device of claim 33 wherein when the logic processing performs the operation of obtaining QCODE values for a prefix portion, namespace portion, and suffix portion associated with the data in the value field of the at least one encoded item, the logic processing performs the operations of:
determining if a QCODE has been previously generated based on the hash for the data within the value field of the encoded item;
if a QCODE has been previously generated, obtaining the previously generated QCODE for the data within the value field of the encoded item;
if a QCODE has not been previously generated:
i) generating a QCODE on the data within the value field of the at least one encoded item; and
ii) maintaining the generated QCODE in a list of QCODEs;
obtaining a namespace QCODE for the namespace portion associated with the value field of the encoded item; and
obtaining a QCODE for at least one of prefix or suffix data within the value field of the encoded item.

35. The processing device of claim 23 wherein when the logic processing performs the operation of allocating an appropriate type of node based on the type of the at least one encoded item as the new node within the buffer of nodes, the logic processing performs the operation of:
identifying a sequence of encoded items representing an element within the markup language representation and in response, allocating an element node within the buffer of nodes;
and wherein when the logic processing performs the operation of setting data fields within the new node with corresponding data associated with the at least one encoded item, the logic processing performs the operations of:
setting a value pointer of the element node to point to a memory location containing a value of text of a markup language construct represented by the value field of the at least one encoded item; and
setting a QNAME field of the element node to contain a QNAME generated based on data in the value field of the at least one encoded item.

36. The processing device of claim 23 wherein when the logic processing performs the operation of allocating an appropriate type of node based on the type of the at least one encoded item as the new node within the buffer of nodes, the logic processing performs the operations of:
identifying a sequence of encoded items representing an attribute element within the markup language representation and in response, allocating an attribute node within the buffer of nodes;
and wherein when the logic processing performs the operation of setting data fields within the new node with corresponding data associated with the at least one encoded item, the logic processing performs the operations of:
setting a value pointer of the attribute node to point to a memory location containing a value of an attribute of a markup language construct represented by the value field of the at least one encoded item;
setting a QNAME field of the attribute node to contain a QNAME generated based on data in the value field of the at least one encoded item; and
setting a related node data field to reference at least one of:
i) a sibling node existing in the buffer as a child of a parent node that is an element node; and
ii) a parent node that is an element node.

37. The processing device of claim 23 wherein when the logic processing performs the operation of allocating an appropriate type of node based on the type of the at least one encoded item as the new node within the buffer of nodes, the logic processing performs the operation of:
identifying a sequence of encoded items representing an text element within the markup language representation and in response, allocating a text node within the buffer of nodes;
and wherein when the logic processing performs the operation of setting data fields within the new node with corresponding data associated with the at least one encoded item, the logic processing performs the operation of:
setting a value pointer of the text node to point to a memory location containing a value of text of a markup language construct represented by the value field of the at least one encoded item.

38. The processing device of claim 23 wherein when the logic processing performs the operation of allocating an appropriate type of node based on the type of the at least one encoded item as the new node within the buffer of nodes, the logic processing performs the operation of:
identifying a sequence of encoded items representing a processing instruction construct within the markup language representation and in response, allocating a processing instruction node within the buffer of nodes;

and wherein when the logic processing performs the operation of setting data fields within the new node with corresponding data associated with the at least one encoded item, the logic processing performs the operations of:

setting a value pointer of the element node to point to a memory location containing a value of text of a markup language construct represented by the value field of the at least one encoded item; and setting a QNAME field of the element node to contain a QNAME generated based on data in the value field of the at least one encoded item.

39. The processing device of claim 23 wherein the input interface comprises:

an input interface for receiving a plurality of streams of encoded items containing type, length, value representations of extensible markup language constructs, wherein each received stream corresponds to a different document that includes the extensible markup language constructs represented in that stream; and wherein the logic processing coupled to the input interface is configured to assign an identity to each received stream, and execute a conversion on a particular received stream by performing the steps of identifying, establishing, and creating on the particular received stream, wherein the particular received stream is identified by its identity;

the processing device comprising:

a session switch coupled to the logic processing to indicate that a different stream is to be converted by providing the identity of that stream to the logic processing.

40. The processing device of claim 39 wherein the logic processing coupled to the input interface is configured to interleave the processing of the received stream and the different stream.

41. A computer program product having a computer-readable storage medium including computer program logic encoded thereon that, when executed on processor within a computerized device, provides a tree builder that converts a markup language representation to a data structure format containing representations of constructs in the markup language representation by performing the operations of:

receiving a markup language representation containing encoded items representative of markup language constructs, by receiving a stream of encoded items containing type, length, value representations of extensible markup language constructs within the markup language representation;

identifying a sequence of encoded items within an intermediate representation that represents a respective markup language construct, wherein identifying a sequence of encoded items within the intermediate representation that represents a respective markup language construct comprises:

obtaining at least one encoded item from the received markup language representation; and matching the type of the at least one encoded item to identify a markup language construct that will require creation of at least one of:

i) a new attribute node within the buffer of nodes;
ii) a new element node within the buffer of nodes;
iii) a new processing instruction node within the buffer of nodes; and
iv) a new content node within the buffer of nodes;

establishing, within a buffer of nodes, a new node for the sequence of encoded items that represents a respective markup language construct; by:

allocating an appropriate type of node, based on the type of at least one encoded item in the sequence of encoded items, as the new node within the buffer of nodes; and setting data fields within the new node with corresponding data associated with the at least one encoded item, the data fields including a node type data field and a set of related node data fields associating the new node to at least one other node previously allocated in the buffer;

creating, from the buffer of nodes, a linked data structure that represents relationships between the markup language constructs represented within the markup language representation, wherein creating, from the buffer of nodes, a linked data structure comprises:

creating a tree data structure from the buffer of nodes, the tree data structure containing linked nodes that represent a hierarchical relationship existing between the markup language constructs represented within the markup language representation; and generating a numeric representation of a value field of the at least one encoded item including generating a QNAME for data within the value field of the at least one encoded item by combining QCODE values for a prefix portion, namespace portion, and suffix portion associated with the data in the value field of the at least one encoded item; wherein a QCODE is a hash of the data within the value field of the at least one encoded item and the hash provides a numeric reference that uniquely matches the data that is hashed.

42. The computer program product of claim 41 wherein the operation of receiving comprises:

receiving a plurality of streams of encoded items containing type, length, value representations of extensible markup language constructs, wherein each received stream corresponds to a different document that includes the extensible markup language constructs represented in that stream;

and wherein the computer program product performs operations of:

assigning an identity to each received stream;

executing a conversion on a particular received stream, by performing the steps of identifying, establishing, and creating on the particular received stream, wherein the particular received stream is identified by its identity; and indicating that a different stream is to be converted by providing the identity of that stream.

43. A method for converting a markup language representation to a data structure format, the method comprising:

receiving a markup language representation containing encoded items representative of markup language constructs, by receiving a stream of encoded items containing type, length, value representations of extensible markup language constructs within the markup language representation;

identifying data within the markup language representation that represents a respective markup language construct, wherein identifying data within the markup language representation that represents a respective markup language construct comprises:

obtaining at least one encoded item from the received markup language representation; and matching the type of the at least one encoded item to identify a markup language construct that will require creation of at least one of:
  i) a new attribute node within a buffer of nodes;
  ii) a new element node within the buffer of nodes;
  iii) a new processing instruction node within the buffer of nodes; and
  iv) a new content node within the buffer of nodes;
generating a numeric representation for the data, the numeric representation providing a unique searchable value that corresponds to the data and that may be searched faster than searching for the data itself;
establishing a new node in a linked data structure of nodes that represent respective markup language constructs within the markup language representation, the new node containing the numeric representation for the data;
establishing, within a buffer of nodes, a new node for the sequence of encoded items that represents a respective markup language construct, by:
  allocating an appropriate type of node, based on the type of at least one encoded item in the sequence of encoded items, as the new node within the buffer of nodes;
setting data fields within the new node with corresponding data associated with the at least one encoded item, the data fields including a node type data field and a set of related node data fields associating the new node to at least one other node previously allocated in the buffer; and
generating a numeric representation of a value field of the at least one encoded item including generating a QNAME for data within the value field of the at least one encoded item by combining QCODE values for a prefix portion, namespace portion, and suffix portion associated with the data in the value field of the at least one encoded item; wherein a QCODE is a hash of the data within the value field of the at least one encoded item and the hash provides a numeric reference that uniquely matches the data that is hashed.

44. The method of claim 43 wherein generating a numeric representation for the data comprises generating a QNAME for the data.

45. The method of claim 44 wherein generating a QNAME for the data comprises:
  maintaining pools of QNAMES for previously identified data within already encountered markup language constructs;
  receiving data associated with a markup language construct for which a QNAME is to be generated; and
  determining that the data for which the QNAME is to be generated already has an existing QNAME in a QNAME pools, and in response, providing the QNAME from the QNAME pool for that data.

46. The method of claim 43 wherein receiving comprises:
  receiving a plurality of streams of encoded items containing type, length, value representations of extensible markup language constructs, wherein each received stream corresponds to a different document that includes the extensible markup language constructs represented in that stream;
and wherein the method includes:
  assigning an identity to each received stream;
  executing a conversion on a particular received stream, by performing the steps of identifying, establishing, and creating on the particular received stream, wherein the particular received stream is identified by its identity; and
  indicating that a different stream is to be converted by providing the identity of that stream.

* * * * *